US011317147B2

(12) United States Patent
Alameh et al.

(10) Patent No.: US 11,317,147 B2
(45) Date of Patent: Apr. 26, 2022

(54) METHODS, SYSTEMS, AND DEVICES FOR PROCESSING PRIVATE MEDIA CONTENT CAPTURED BY SENSORS OPERATING IN PRIVACY MODES OF OPERATION

(71) Applicant: Motorola Mobility LLC, Chicago, IL (US)

(72) Inventors: Rachid Alameh, Crystal Lake, IL (US); Jarrett Simerson, Glenview, IL (US); Alvin Von Ruff, Woodstock, IL (US)

(73) Assignee: Motorola Mobility LLC, Chicago, IL (US)

( * ) Notice: Subject to any disclaimer, the term of this patent is extended or adjusted under 35 U.S.C. 154(b) by 136 days.

(21) Appl. No.: 16/861,944

(22) Filed: Apr. 29, 2020

(65) Prior Publication Data

US 2021/0344996 A1 Nov. 4, 2021

(51) Int. Cl.
| | |
|---|---|
| H04N 21/442 | (2011.01) |
| G06F 21/62 | (2013.01) |
| H04N 21/414 | (2011.01) |
| H04N 5/77 | (2006.01) |
| H04L 29/06 | (2006.01) |
| H04N 9/31 | (2006.01) |
| H04W 4/029 | (2018.01) |

(52) U.S. Cl.
CPC ... *H04N 21/44218* (2013.01); *G06F 21/6245* (2013.01); *H04L 63/102* (2013.01); *H04N 5/77* (2013.01); *H04N 9/3194* (2013.01); *H04N 21/41407* (2013.01); *H04W 4/029* (2018.02)

(58) Field of Classification Search
CPC .. H04N 21/44218; H04N 5/77; H04N 9/3194; H04N 21/41407; G06F 21/6245; H04L 63/102; H04W 4/029
See application file for complete search history.

(56) References Cited

U.S. PATENT DOCUMENTS

2015/0026234 A1\* 1/2015 Graham ................ H04L 67/02
709/202

OTHER PUBLICATIONS

Germain, Thomas, "How to Protect Yourself from Camera and Microphone Hacking", Consumer Reports Article; Published Jul. 16, 2019; https://www.consumerreports.org/privacy/how-to-protect-yourself-from-camera-and-microphone-hacking/.
Stanley, Jay, "The Privacy Threat from Always-On Microphones Like the Amazon Echo", ACLU Article; Published Jan. 13, 2017; https://www.aclu.org/blog/privacy-technology/privacy-threat-always-microphones-amazon-echo.

\* cited by examiner

*Primary Examiner* — Alazar Tilahun
(74) *Attorney, Agent, or Firm* — Philip H. Burrus, IV

(57) ABSTRACT

An electronic device includes one or more sensors capturing media content from an environment of the electronic device. One or more processors, operable with the one or more sensors, determine whether the media content is private media content. The electronic device includes a private data store and a public data store. When the one or more processors determine the media content is the private media content, the one or more processors store the private media content in the private data store and preclude transmission of the private media content from the private data store to another electronic device. When the one or more processors determine the media content is other than the private media content, the one or more processors store the media content in the public data store and permit transmission of the media content to the another electronic device.

20 Claims, 9 Drawing Sheets

METHODS, SYSTEMS, AND DEVICES FOR PROCESSING PRIVATE MEDIA CONTENT CAPTURED BY SENSORS OPERATING IN PRIVACY MODES OF OPERATION

BACKGROUND

Technical Field

This disclosure relates generally to electronic devices having sensors, and more particularly to electronic devices having sensors operable to capture media content.

Background Art

Portable electronic devices, such as smartphones, tablet computers, and other devices, are continually becoming more sophisticated. Modern smartphones, for example, are equipped with high-resolution image capture devices and near studio quality microphones that make carrying a separate camera or sound recorder unnecessary. Users employ these portable electronic devices to capture images, videos, sound recordings, and other media content. Users also employ these devices to share the media content with others, either directly or via social media. It would be advantageous to have improved methods, systems, and devices to protect private media content from being shared.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
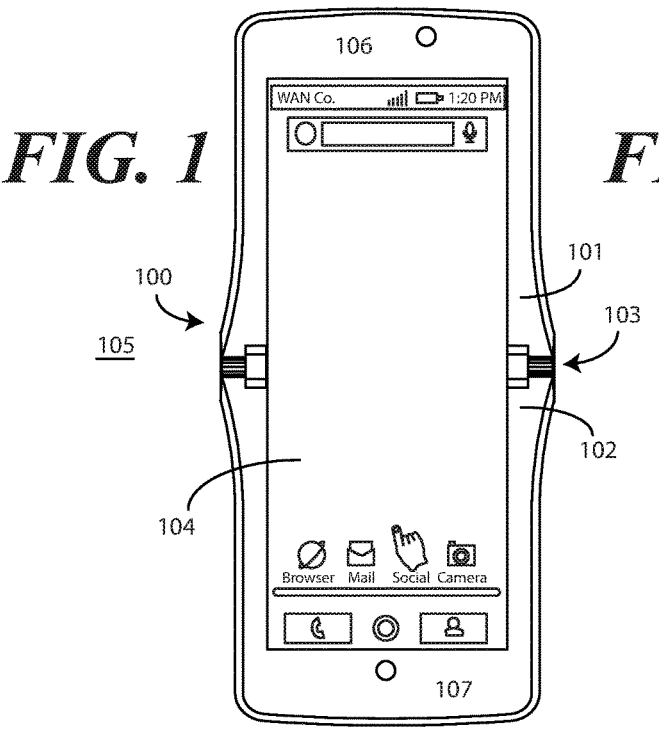
FIG. 1 illustrates a front elevation view of one explanatory electronic device configured in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to precluding the transmission of private media content from a private data store of an electronic device, while permitting the transmission of other media content from a public data store, which could be located within the electronic device, in a companion device, in the cloud, or elsewhere. Any process descriptions or blocks in flow charts should be understood as representing modules, segments, or portions of code that include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of, when one or more processors of an electronic device determine that media content is private media content, storing the private media content in a private data store and precluding the transmission of the private media content from the private data store to another electronic device, but when the one or more processors determine that the media content is other than private media content, storing the media content in a public data store and permitting transmission of the media content from the public data store to other electronic devices as described herein. The non-processor circuits may include, but are not limited to, a radio receiver, a radio transmitter, signal drivers, clock circuits, power source circuits, and user input devices.

As such, these functions may be interpreted as steps of a method to perform storing private media content in a private data store and precluding transmission of the private media content from the private data store, while also storing public media content in a public data store and permitting transmission of the public media content from the public data store to other electronic devices. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. As used herein, components may be "operatively coupled" when information can be sent between such components, even though there may be one or more intermediate or intervening components between, or along the connection path.

The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide electronic devices, methods, and systems that store private media content in a secured and private data store located only in the electronic device itself while precluding transmission of the private media content from the private data store. At the same time, embodiments of the disclosure store normal media content, i.e., content suitable for sharing or showing in public, in a public data store.

In one or more embodiments, the public data store is located in the electronic device. However, in other embodiments the public data store is located elsewhere, such as in a companion electronic device, e.g., a jump drive, fob, or other external memory device, in the cloud, or combinations thereof. In one or more embodiments, when the media content is public media content, one or more processors of the electronic device freely permit transmission of the media content from the public data store to other electronic devices.

In one or more embodiments, an electronic device has both private sensors and public sensors. For example, the electronic device may include two image capture devices: a first imager designed to capture public media content, and a second imager designed to capture only private media content. These dual sensor components, e.g., twin microphones and imagers, can be hardwired, respectively, to dual data stores, e.g., a public data store and a private data store. By ensuring that the right component captures media content, which can be a function of user preferences or needs of privacy, private media content can be captured by a first imager and microphone while public media content is captured by a second imager and microphone. In one or more embodiments, a visual indicator is presented on the display or other user interface to indicate which sensor is enabled. For example, the user might be presented with a visual indication of the enabled sensor and associated privacy level. The visual indication could be provided by a light emitting diode (LED), display graphic, or may alternatively be provided in the form of sound, haptics, or other notifications. The private media content can be stored directly in the private data store, and can optionally be precluded from transmission to other electronic devices unless later re-designated as public media content. Similarly, public media content can be stored in the public data store and can be permitted for free sharing with other electronic devices.

In other embodiments, only a dual function, single component, e.g., a single rear-facing imager and a single rear-facing microphone, is included with the electronic device. Where so configured, embodiments of the disclosure operate these components in dual modes of operation. In one or more embodiments, the dual modes of operation comprise a normal mode of operation and a privacy mode of operation. When in the privacy mode of operation, media content captured by the imager, microphone, or other sensor directed via a switch or other gating device to be stored in the private data store. As before, in one or more embodiments the user may optionally also be presented with indication of that privacy storage type level. Media content stored in the private data store is then precluded from leaving the electronic device.

When operating in the normal mode of operation, media content captured by the imager, microphone, or other sensor is directed via the switch or other gating device to be stored in a public data store, be it in the electronic device, in the cloud, in another electronic device, or combinations thereof. Media content stored in the public data store is freely able to be shared with other electronic devices.

The designation, or determination, of whether media content is private or public can occur in a variety of ways, some of which will be disclosed below with reference to FIG. 10. Others will be obvious to those of ordinary skill in the art having the benefit of this disclosure. Additionally, the designation, or determination, of media content as private or public can occur at different times. The designation, or determination, can occur before the media content is captured in one or more embodiments. In other embodiments, the designation or determination can occur after the media content is captured. In the latter case, when the media content was initially designated or determined to be public media content, and is later designated or determined to be private media content, one or more processors of the electronic device can retrieve the private media content from the public data store and move it to the private data store. The one or more processors can also delete the private media content from the public data store to ensure that it is not transmitted to other electronic devices.

Advantageously, embodiments of the disclosure provide new architecture configurations that provide two physically separated data stores: a public data store and a private data store. Media content can be delivered to these physically separated data stores by either physically separated media content capture sensors, which are hard wired, respectively, to the physically separated data stores to ensure appropriate sensor-to-data store storage, or alternatively by single media content capture sensor that is capable of operating in dual modes of operation. In the latter case, a switch or other gating device can direct captured private media content such as voices and scenes for storage in a private data store of the electronic device. Once stored in the private data store, the private media content is thereafter prevented from being shared outside the electronic device. Normal media content can then be stored in the public data store and freely shared with other electronic devices. Advantageously, this separate private data store and/or private media content capture sensors than can be hard-wired to the private data store offer users peace of mind regarding media content designated or determined to be private media content.

In one or more embodiments, an electronic device comprises one or more sensors. In one or more embodiments, the one or more sensors can capture media content from an environment of the electronic device. In one or more embodiments, the one or more sensors comprise at least one imager and at least one microphone.

In one or more embodiments, the electronic device comprises one or more processors, which are operable with the one or more sensors. In one or more embodiments, the one or more processors can determine, such as from user input, analysis of the environment, analysis of the capture media content, or other techniques, whether the media content is private media content.

In one or more embodiments, the electronic device comprises a private data store. In one or more embodiments, the private data store is situated in the electronic device and is operable with the one or more processors. In one or more embodiments, the electronic device also includes a public data store. As with the private data store, in one or more embodiments the public data store resides in the electronic device. However, in other embodiments, the public data store resides outside the electronic device, such as in the cloud at a cloud server, in a companion electronic device such as an external memory device, or elsewhere. Of course, combinations of these can be used with the public data store residing partially in the electronic device and partially in at least one other electronic device, such as in the cloud.

In one or more embodiments, when the one or more processors determine the media content is the private media content, the one or more processors store the private media content in the private data store and preclude transmission of the private media content from the private data store to another electronic device. By contrast, when the one or more processors determine the media content is other than the private media content, e.g., when the one or more processors determine that the media content is public media content, the one or more processors store the media content in the public data store and permit transmission of the media content to the another electronic device in one or more embodiments.

In one or more embodiments, the one or more sensors comprise at least one imager and at least one microphone. Illustrating by example, in one embodiment the electronic device includes separate private and public sensors. Accordingly, the electronic device may have one private imager and one private microphone, which are hardwired to a private data store, and one public imager and one public microphone, which are hardwired to a public data store. Where the electronic device includes separate private sensors and public sensors, it may include multiple sets of such sensors. For instance, the electronic device may include a front-facing private imager, a front-facing private microphone, a front-facing public imager, a front-facing public microphone, a rear-facing private imager, a rear-facing private microphone, a rear-facing public imager, and a rear-facing public microphone. Additional sets of public and private sensors can be included at other locations as well.

In other embodiments, one set of sensors can store media content in both a private data store and a public data store. For example, an imager and a microphone can be operatively coupled via a switch or other gating device to both the private data store and the public data store. This imager and microphone can then operate in either a normal mode of operation in which captured media content is stored in the public data store or in a privacy mode of operation in which media content is stored in the private data store. As with the physically separate sensors, when one sensor set is used to store media content in both the private data store and the public data store, multiple sensors can be configured in this way. The electronic device may include a front-facing imager and front-facing microphone capable of storing media content in the private data store or public data store depending upon the mode of operation and a rear-facing imager and rear-facing microphone capable of storing media content in the public data store or private data store. Additional dual-mode sensors can be included at other locations as well.

Figure 2:
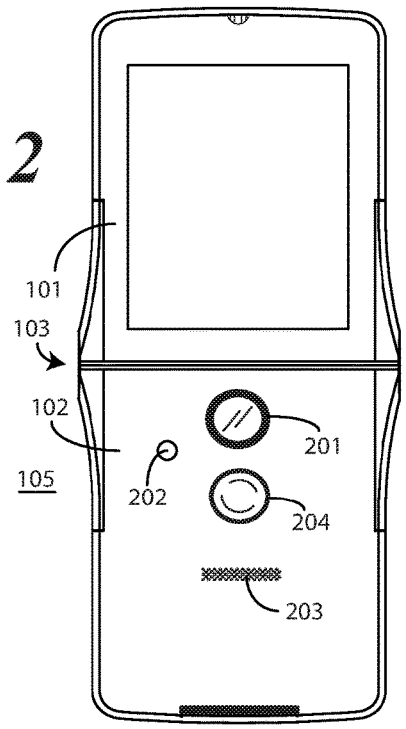
FIG. 2 illustrates a rear elevation view of one explanatory electronic device configured in accordance with one or more embodiments of the disclosure.

Turning now to FIGS. 1 and 2, illustrated there is one explanatory electronic device 100 configured in accordance with one or more embodiments of the disclosure. The electronic device 100 of FIGS. 1 and 2 is configured as a portable electronic device. For illustrative purposes, the electronic device 100 is shown as a smartphone that includes one or more device features that can be actuated, adjusted, and terminated by a user. However, the electronic device 100 could be any number of other devices as well, including tablet computers, wearable electronic devices, gaming devices, multimedia players, Internet-of-things (IOT) devices such as recording security cameras, and so forth. Still other types of electronic devices configured in accordance with one or more embodiments of the disclosure as will be readily appreciated by those of ordinary skill in the art having the benefit of this disclosure.

Figure 5:
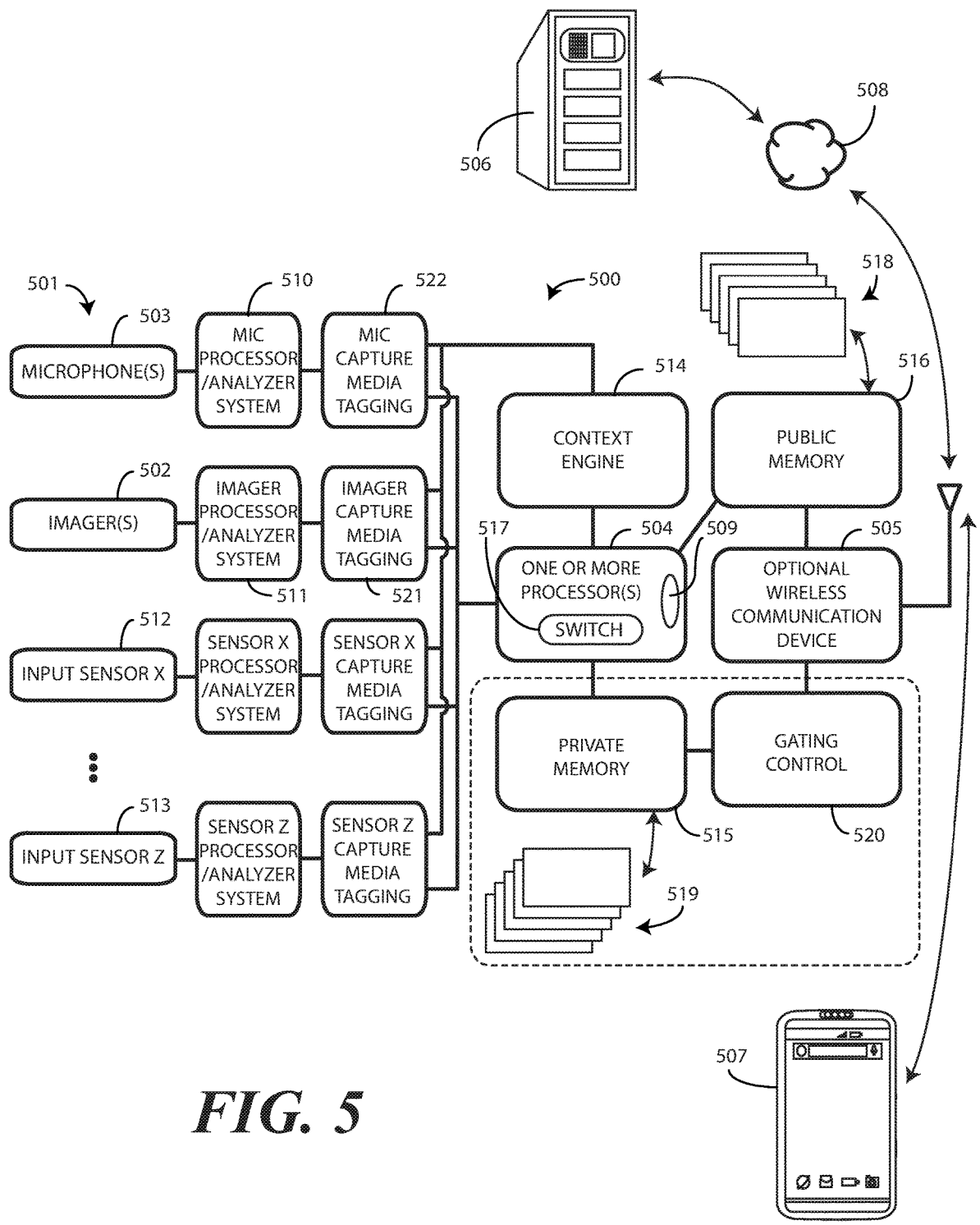
FIG. 5 illustrates a schematic block diagram of one explanatory electronic device and system configured in accordance with one or more embodiments of the disclosure.
Figure 6:
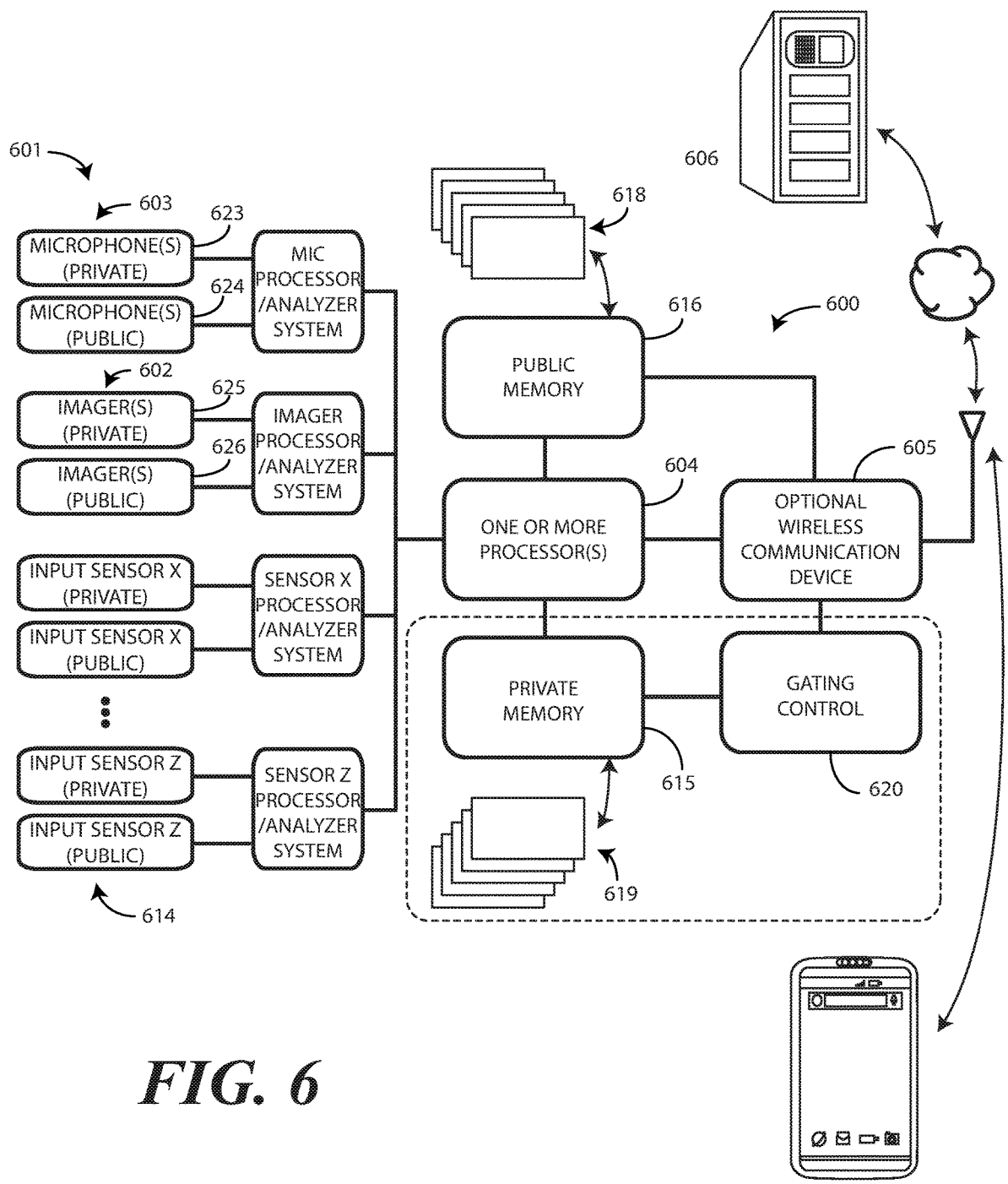
FIG. 6 illustrates a schematic block diagram of another explanatory electronic device and system configured in accordance with one or more embodiments of the disclosure.

In this illustrative embodiment, the electronic device 100 is configured as a "flip" device that includes a first device housing 101 and a second device housing 102. In one or more embodiments, a hinge 103 couples the first device housing 101 to the second device housing 102. This configuration of an electronic device is illustrative only, however. In other embodiments, the electronic device 100 could be configured as a "candy bar" device in which the device housing is substantially rigid, i.e., not deformable, and includes no hinges or other deformable components. Examples of such a candy bar device are shown in FIGS. 5 and 6.

As best seen in FIG. 2, one or more features can be incorporated into one or both of the first device housing 101 of electronic device 100 or the second device housing 102 of electronic device 100). Examples of such features include one or more sensors operable to capture media content from an environment 105 around the electronic device 100.

In the illustrative embodiment of FIG. 2, the one or more sensors include a camera or imager 201, one or more microphones 202, and/or a user interface component 204, which may be a button, touch sensor, or touch sensitive surface. The camera or imager 201 can comprise a two-dimensional Red-Green-Blue (RGB) imager in one or more embodiments. In other embodiments, the camera or imager 201 comprises an infrared imager. Other types of imagers suitable for use as the imager 201 of the electronic device 100 will be obvious to those of ordinary skill in the art having the benefit of this disclosure.

In one or more embodiments, the electronic device 100 includes only a single imager 201 and a single microphone 202. As will be described in more detail below with reference to FIG. 5, this single imager 201 and single microphone 202 are operable to store media content in both a private data store and a public data store. For example, the imager 201 and the microphone 202 can be operatively coupled via a switch or other gating device to both the private data store and the public data store. The switch or other gating device could be voice activated as well. The imager 201 and microphone 202 can then operate in either a normal mode of operation in which captured media content is stored in the public data store or in a privacy mode of operation in which media content is stored in the private data store.

In other embodiments when one sensor set, e.g., one imager/microphone combination, is used to store media content in both the private data store and the public data store, multiple sensors can be configured in this way. The electronic device 100 may include a front-facing imager 106 and front-facing microphone 107 capable of storing media content in the private data store or public data store depending upon the mode of operation in addition to imager 201, which is a rear-facing imager, and microphone 202, which is rear-facing microphone. Additional dual-mode sensors can be included at other locations as well.

The features can also include components other than sensors as well, such as an optional speaker port 203 that functions as an audio output device. While these features are shown being disposed on the rear major face of electronic device 100 in this embodiment, they could be located elsewhere, such as on the front major face, on side minor faces, on one or both of the device housings of electronic device 100, or in other locations in other embodiments.

In one or more embodiments, the one or more sensors, which include the imager 201 and the microphone 202, are configured to function in two distinct modes of operation: a normal mode of operation and a privacy mode of operation. When operating in the privacy mode of operation, media content captured by the imager 201 and/or the microphone 202, is stored in a private data store (described below with reference to FIGS. 5 and 6) located only within the electronic device 100. In one or more embodiments, one or more processors of the electronic device 100 further preclude the transmission of this private media content from the private data store to other electronic devices, thereby protecting the privacy of an authorized user of the electronic device 100.

By contrast, when operating in the public mode of operation, media content captured by the imager 201 and/or the microphone 202 is stored in a public data store (also described below with reference to FIGS. 5 and 6). The public data store can reside within the electronic device 100 in one or more embodiments. However, the public data store can reside elsewhere as well. In some embodiments the public data store can reside at a cloud server, in a companion device such as a jump memory drive, dedicated storage device sitting at home, or other electronic device. Of course, a combination of data storage situated within the electronic device and in another electronic device, e.g., the cloud, could be used as well. In one or more embodiments, the one or more processors of the electronic device 100 permit transmission of media content stored in the public data store to other electronic devices without limitation.

Figure 3:
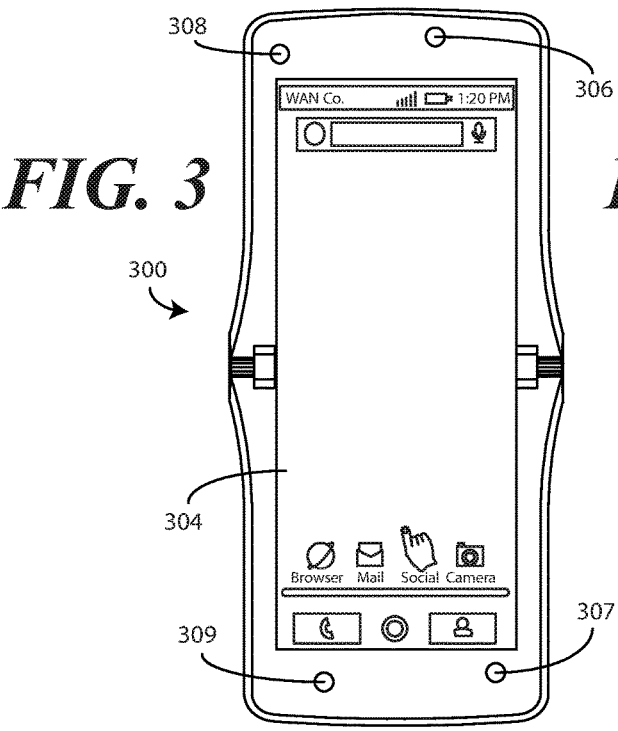
FIG. 3 illustrates a front elevation view of another explanatory electronic device configured in accordance with one or more embodiments of the disclosure.
Figure 4:
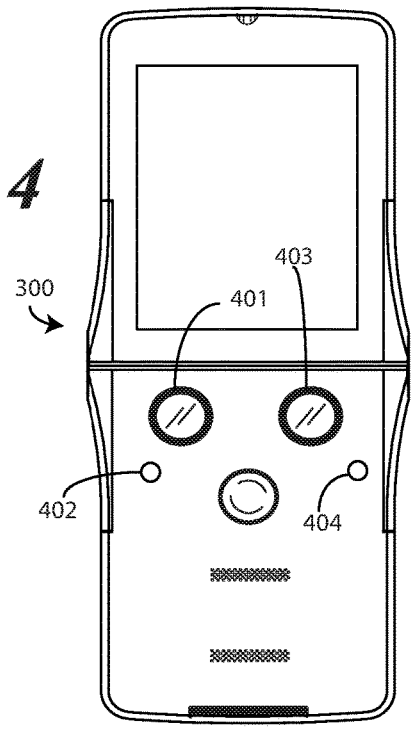
FIG. 4 illustrates a rear elevation view of another explanatory electronic device configured in accordance with one or more embodiments of the disclosure.

Turning now to FIGS. 3 and 4, illustrated therein is another electronic device 300 configured in accordance with one or more embodiments of the disclosure. The electronic device 300 of FIGS. 3 and 4 is substantially similar to the electronic device (100) of FIGS. 1 and 2. However, rather than having a single imager (201) and/or microphone (202), here the electronic device 300 includes dual sensors that are each operable in a dedicated mode of operation. In this embodiment, the electronic device 300 includes a first imager 401 and a first microphone 402, which are configured to capture only private media content. In one or more embodiments, this first set of sensors can be hardwired or otherwise operatively coupled to the private data store, thereby ensuring that all private media content captured by the first imager 401 and the first microphone 402 is securely stored only in the private data store and providing consumers of extra privacy where data could not be shared inadvertently via a software glitch.

In this illustrative embodiment, the electronic device 300 also includes a second imager 403 and a second microphone 404. In one or more embodiments, this second sensor set is physically and electrically independent of the first imager 401 and the first microphone, and are configured to capture only public, i.e., sharable with others, media content. In one or more embodiments, this second set of sensors is coupled to a public data store, which as noted above, can reside wholly within the electronic device 300, partially within the electronic device 300 and partially within another electronic device, e.g., the cloud, or exclusively outside the electronic device 300, e.g., in the cloud. In one or more embodiments, one or more processors of the electronic device 300 allow content captured by the second imager 403 and the second microphone 404 to be shared with other electronic devices. This sharing can include transmitting the public media content directly to the other electronic device, e.g., via text or multimedia message, by posting the public media content to third party servers, e.g., social media servers, or by other techniques.

In effect, the first imager 401 and the first microphone 402 process captured media content by storing the media content in the dedicated and secure storage of the private data store only, with the one or more processors of the electronic device 300 precluding transmission of this private media content to other electronic devices. By contrast, the second imager 403 and the second microphone 404 process captured media content by storing the media content in the public data store, where sharing with other electronic devices, including cloud servers, social media servers, or other electronic devices is permitted.

As with the dual-mode sensors of FIGS. 1-2 above, the electronic device 300 may include one set of physically separated sensors or multiple sets of physically separated sensors. Accordingly, the electronic device may have one private imager, e.g., imager 401, and one private microphone, e.g., microphone 402, which are hardwired to a private data store, and one public imager, e.g. imager 403, and one public microphone, e.g., microphone 404, which are hardwired to a public data store.

Alternatively, the electronic device 300 may include multiple sets of such sensors. For instance, the electronic device 300 may include a front-facing private imager 306, a front-facing private microphone 307, a front-facing public imager 308, a front-facing public microphone 309, a rear-facing private imager, e.g., imager 401, a rear-facing private microphone, e.g., microphone 402, a rear-facing public imager, e.g., imager 403, and a rear-facing public microphone, e.g., microphone 404. Additional sets of public and private sensors can be included at other locations as well.

In one or more embodiments, when a pending media content capture operation is designated as being a private media content capture event, e.g., when an authorized user of the electronic device 300 actuates a media content capture application and designates the media content capture operation as being private, the one or more processors of the electronic device 300 actuate the first imager 401 and the first microphone 402. The one or more processors can also optionally disable the second imager 403 and the second microphone 404.

Upon capturing the media content, the fact that the first imager and the first microphone 402 have a dedicated operative coupling to the private data store results in the captured media content being stored only within the electronic device 300, i.e., only within the private data store that resides within the confines of the housing of the electronic device 300. In one or more embodiments, the one or more processors of the electronic device 300 then preclude transmission of the private media content from the private data store to other electronic devices. This results in sharing or posting to social media being blocked.

As will be described in more detail below, in one or more embodiments the one or more processors can alert the user in response to share attempts by presenting a notification on the display 304 of the electronic device 300 indicating that the media content attempting to be shared is private media content. The one or more processors can optionally request for additional authentication credentials to override this preclusion that, when entered, cause the captured media content to transition from private media content to public media content. This results in the media content being transferred out of the private data store and into the public data store, where it can freely be shared. In one or more embodiments, when the captured media content is private media content, tagging of the media content as being private occurs only within the electronic device 300. This means that cloud servers, remote services, e.g., location detection services, etc., are not used in the tagging process.

In one or more embodiments, when a pending media content capture operation is designated as being a normal media content capture event, e.g., when an authorized user of the electronic device 300 actuates a media content capture application and does not designate the media content capture operation as being private, the one or more processors of the electronic device 300 actuate the second imager 403 and the second microphone 404. The one or more processors can also optionally disable the first imager 401 and the first microphone 402 and indicate to user such deactivation.

Upon capturing the media content, the second imager 403 and the second microphone 404 store the captured media content in the public data store. In one or more embodiments, the one or more processors of the electronic device 300 permit transmission of the media content from the public data store to other electronic devices. Accordingly, the authorized user of the electronic device 300 can freely share the media content with others, post the media content to social media, and so forth.

In one or more embodiments when, for whatever reason, captured media content is initially designated as, or determined to be, normal, sharable, or public media content, but is then later marked as private media content, the one or more processors of the electronic device 300 can take action to remove the private media content from the public data store automatically and transfer it to the private data store. Illustrating by example, if the public data store includes storage in the cloud, and the authorized user of the electronic device 300 changes the privacy marking to designate the captured media content as private media content, the one or more processors of the electronic device 300 can reverse the public data store storage process assuring cloud data deletion.

In one or more embodiments, this reversal results in the media content being retrieved from the cloud by the one or more processors. The one or more processors may also initiate a deletion request causing the media content to be deleted from the cloud server. The one or more processors can then store the media content in the private data store of the electronic device 300. As such, this reversal results in the media content no longer being sharable from the electronic device 300. Optionally, when sharing of private media content is attempted, the one or more processors can request additional authorization to override the sharing block. For instance, the one or more processors may actuate a biometric sensor such as a facial depth scanner, voice identification, or asking user to authenticate via fingerprint sensor, or entering a pass code to obtain additional authorization to override the sharing block and return the private media content to the public data store.

Turning now back to FIGS. 1 and 2, when only one imager 201 and microphone 202 are provided, in one or more embodiments they are operable in a dual mode of operation. In one or more embodiments, when a pending media content capture operation is designated as being a private media content capture event, e.g., when an authorized user of the electronic device 100 actuates a media content capture application and designates the media content capture operation as being private, the one or more processors of the electronic device 100 actuate the imager 201 and the microphone 202.

Upon actuate the imager 201 and the microphone 202 capturing the media content, the one or more processors of the electronic device 100 toggle a switch or other gating device coupled between the sensors and the data stores, thereby causing the captured media content being stored only within the private data store residing within the confines of the housing of the electronic device 100. In one or more embodiments, the one or more processors of the electronic device 300 then preclude transmission of the private media content from the private data store to other electronic devices. This results in sharing or posting to social media being blocked.

In one or more embodiments, when a pending media content capture operation is designated as being a normal, public, and/or sharable media content capture event, e.g., when an authorized user of the electronic device 100 actuates a media content capture application and omits designating the media content capture operation as being private, the one or more processors of the electronic device 100 again actuate the imager 201 and the microphone 202.

Upon the imager 201 and the microphone 202 capturing the media content, the one or more processors again toggle the switch or other gating device, thereby causing the captured media content to be stored in the public data store. In one or more embodiments, the one or more processors of the electronic device 100 also permit transmission of the media content from the public data store to other electronic devices. Accordingly, the authorized user of the electronic device 100 can freely share the media content with others, post the media content to social media, and so forth.

In an alternate embodiment, the one or more processors are instead configured default to a condition where any captured media content that remains untagged by the user is considered to private media content by default (requiring private sensors and private storage and prohibiting sharing with outside devices). In such an embodiment, the user would need to override this default condition to make the private media content public media content. Advantageously, this embodiment underscores the many unique ways in which embodiments of the disclosure can be personally configured to suit the needs of any particular user.

As with the electronic device (300) of FIGS. 3 and 4, when captured media content is initially designated as, or determined to be, normal, sharable, or public media content, but is then later marked as private media content, the one or more processors of the electronic device 100 can take action to remove the (now) private media content from the public data store and transfer it to the private data store. Illustrating by example, if the public data store includes storage in the cloud, and the authorized user of the electronic device 100 changes the privacy marking to designate the captured media content as private media content, the one or more processors of the electronic device 100 can reverse the public data store storage process. If that operation cannot be performed, such as in situations where the user no longer has exclusive control of the electronic device or the media content, such as might be the case when the user has previously shared the media content with a friend, in one or more embodiments the friend will be sent a automatic notification indicating that shared data is private following privacy switching. In one or more embodiments, this notification can initiate a deletion procedure, where permitted. In another embodiment, the notification can invite the recipient, here the friend, to delete the media content since it has now been designated to be private media content.

In one or more embodiments, this reversal results in the media content being retrieved from the cloud by the one or more processors. The one or more processors may also initiate a deletion request causing the media content to be deleted from the cloud server. The one or more processors can then store the media content in the private data store of the electronic device 100. As such, this reversal results in the media content no longer being sharable from the electronic device 100. Optionally, when sharing of private media content is attempted, the one or more processors can request additional authorization to override the sharing block. For instance, the one or more processors may actuate a biometric sensor such as a facial depth scanner to obtain additional authorization to override the sharing block and return the private media content to the public data store.

In one or more embodiments, if an authorized user of the electronic device 100 attempts to share private media content stored within the private data store, the one or more processors can present a prompt on the display 104 alerting the authorized user to the fact that the media content attempting to be shared is private media content and/or that sharing is blocked. The one or more processors can optionally request for additional authentication credentials to override this preclusion that, when entered, cause the captured media content to transition from private media content to public media content. This results in the media content being transferred out of the private data store and into the public data store, where it can freely be shared. In one or more embodiments, when the captured media content is private media content, tagging of the media content as being private occurs only within the electronic device 100. This means that cloud servers, remote services, e.g., location detection services, etc., are not used in the tagging process.

Turning now to FIG. 5, illustrated therein is one explanatory block diagram schematic 500 of one or more components suitable for inclusion with the electronic device (100) of FIGS. 1 and 2. In one or more embodiments, the block diagram schematic 500 is configured as a printed circuit board assembly disposed within or one or both of the first device housing (101) and/or second device housing (102) of electronic device (100). Various components can be electrically coupled together by conductors or a bus disposed along one or more printed circuit boards.

It should be noted that the block diagram schematic 500 includes many components that are optional, but which are included in an effort to demonstrate how varied electronic devices configured in accordance with embodiments of the disclosure can be. Thus, it is to be understood that the block diagram schematic 500 of FIG. 5 is provided for illustrative purposes only and for illustrating components of one electronic device (100) in accordance with embodiments of the disclosure.

The block diagram schematic 500 of FIG. 5 is not intended to be a complete schematic diagram of the various components required for an electronic device (100). Therefore, other electronic devices in accordance with embodiments of the disclosure may include various other components not shown in FIG. 5, or may include a combination of two or more components or a division of a particular component into two or more separate components, and still be within the scope of the present disclosure.

The illustrative block diagram schematic 500 of FIG. 5 includes many different components. Embodiments of the disclosure contemplate that the number and arrangement of such components can change depending on the particular application. For example, a wearable electronic device may have fewer, or different, components from a non-wearable electronic device. Similarly, an electronic device configured as a dedicated gaming device may have fewer, or different, components from a smartphone, and so forth. Accordingly, electronic devices configured in accordance with embodiments of the disclosure can include some components that are not shown in FIG. 5, and other components that are shown may not be needed and can therefore be omitted.

While not specifically shown in FIG. 5, in one or more embodiments the electronic device (100) includes a user interface. One example of such a user interface is the display (104) shown in FIG. 1. The user interface can optionally include secondary displays, such as that shown in FIG. 2. The user interface can also include one or more sensors 501, which can include one or more imagers 502, one or more microphones 503, one or more touch sensors, and other sensors that which will be described in more detail below. The one or more imagers 502 can include two-dimensional imagers configured to receive at least one image of a person or other objects within an environment (105) of the electronic device (100).

In one embodiment, the electronic device (100) includes one or more processors 504. In one embodiment, the one or more processors 504 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the block diagram schematic 500. Each of the application processor and the auxiliary processor(s) can be configured to process and execute executable software code to perform the various functions of the electronic device (100) with which the block diagram schematic 500 operates.

In this illustrative embodiment, the block diagram schematic 500 also includes a communication circuit 505 that can be configured for wired or wireless communication with one or more other devices or networks. Examples of such other devices shown in FIG. 5 include a cloud server 506 and another portable electronic device 507, shown here as another smartphone. Other examples of devices with which the communication circuit 505 can communicate will be obvious to those of ordinary skill in the art having the benefit of this disclosure. The networks, e.g., network 508, can include a wide area network, a local area network, and/or personal area network. The communication circuit 505 may also utilize wireless technology for communication, such as, but are not limited to, peer-to-peer or ad hoc communications such as HomeRF, Bluetooth and IEEE 802.11 and other forms of wireless communication such as infrared technology. The communication circuit 505 can include wireless communication circuitry, one of a receiver, a transmitter, or transceiver, and one or more antennas.

In one embodiment, the one or more processors 504 can be responsible for performing the primary functions of the electronic device (100) with which the block diagram schematic 500 is operational. For example, in one embodiment the one or more processors 504 comprise one or more circuits operable with the user interface to present presentation information to a user, such as by presenting prompts on a display (104) of the electronic device (100). Additionally, the one or more processors 504 can be operable with an audio output, such as speaker port (203) of FIG. 2, to deliver audio output to a user. The executable software code used by the one or more processors 504 can be configured as one or more modules 509 that are operable with the one or more processors 504. Such modules 509 can store instructions, control algorithms, and so forth.

In one or more embodiments, each sensor of the one or more sensors 501 is operable with a processor analyzer system. Illustrating by example, in this illustrative embodiment, the one or more sensors 501 include one or more imagers, 502, e.g., imager (201), and one or more microphones 503, e.g., microphone (202). As noted above with reference to FIGS. 1-2, the one or more imagers 502 can include a front-facing camera or imager, a rear-facing camera or imager, another imager, or combinations thereof. Similarly, the one or more microphones 503 can include a front-facing microphone, a rear-facing microphone, another microphone, or combinations thereof.

In one or more embodiments, the one or more microphones 503 are operable with an audio processor/system 510, while the one or more imagers 502 are operable with an imager processor/system 511. The other sensors can include corresponding processor/systems as shown.

Beginning with the audio processor/system 510, in one or more embodiments the audio processor/system 510 is operable to receive audio input from a source via the one or more microphones 503, such as a person or persons, who are situated within an environment (105) about the electronic device (100). The audio processor/system 510 can also receive audio input from the environment (105) as well via the one or more microphones 503. The audio processor/system 510 can include hardware, executable code, and speech monitor executable code in one embodiment.

In one embodiment, the audio processor/system 510 is configured to implement a voice control feature that allows the electronic device (100) to function as a voice assistant device, which is a digital assistant using voice recognition, speech synthesis, and natural language processing to receive audio input comprising a voice command from a source, determine the appropriate response to the voice command, and then deliver the response in the form of audio output in response to receiving the audio input from the source. When so configured, a user can speak commands to cause the one or more processors 504 of the electronic device (100) to execute a control operation. In one or more embodiments the audio processor/system 510 listens for voice commands, processes the commands and, in conjunction with the one or more processors 504, performs one or more control operations, such as delivering audio output, in response to receiving audio input. While the one or more microphones 503 can be used to sense voice input, voice commands, and other audio input, in one or more embodiments they can also be used as environmental sensors to sense environmental sounds as well.

An imager processor/system 511 can be operable with the one or more imagers 502 in the same way that the audio processor/system 510 is operable with the one or more microphones 503. In one or more embodiments, the imager processor/system 511 can be configured to analyze images captured by the one or more imagers 502.

For example, the imager processor/system 511 can be configured to compare captured images to one or more predefined authentication references stored in a memory. This comparison, in one or more embodiments, is used to confirm beyond a threshold authenticity probability that an object, such as a person's face, sufficiently matches one or more of the predefined authentication references stored in the memory to authenticate a person as an authorized user of the electronic device (100). Beneficially, this optical recognition performed by the imager processor/system 511 can allow access to the electronic device (100) only when one of the persons detected about the electronic device (100) are sufficiently identified as an authorized user of the electronic device (100).

In addition to the one or more imagers 502 and the one or more microphones 503, the one or more sensors 501 can include other sensors 512,513 as well. A first example of a sensor that can be included as one of the other sensors 512,513 is a touch sensor. The touch sensor can include a capacitive touch sensor, an infrared touch sensor, resistive touch sensors, or another touch-sensitive technology.

Another sensor that can be included with the other sensors 512,513 is a depth scanner. Where included, the depth scanner can take a variety of forms. In a first embodiment, the depth scanner comprises a pair of imagers separated by a predetermined distance, such as three to four images. This "stereo" imager works in the same way the human eyes do in that it captures images from two different angles and reconciles the two to determine distance.

In another embodiment, the depth scanner employs a structured light laser. The structured light laser projects tiny light patterns that expand with distance. These patterns land on a surface, such as a user's face, and are then captured by an imager. By determining the location and spacing between the elements of the pattern, three-dimensional mapping can be obtained.

In still another embodiment, the depth scanner comprises a time of flight device. Time of flight three-dimensional sensors emit laser or infrared pulses from a photodiode array. These pulses reflect back from a surface, such as the user's face.

Other sensors that can be included with the other sensors 512,513 are one or more proximity sensors. These sensors can take various forms. In one or more embodiments, the one or more proximity sensors fall in to one of two camps: active proximity sensors and "passive" proximity sensors. The proximity sensors can be generally used for distance determination, such as measuring distances between objects situated within the environment (105) of the electronic device (100) and/or determining changes in distance between the electronic device (100) and objects situated within the environment (105).

Still other sensors that can be included with the other sensors 512,513 include a skin sensor configured to determine when the electronic device (100) is touching the skin of a person. For example, in one or more embodiments the skin sensor can determine when the electronic device (100) is being held within the hand of a user.

Another sensor suitable for inclusion with the other sensors 512,513 is a light sensor. The light sensor can be used to detect whether or not direct light is incident on the housing of the electronic device (100). The light sensor can also be used to detect an intensity of ambient light is above or below a predefined threshold in one or more embodiments.

A temperature sensor can be included with the other sensors 512,513. The temperature sensor can monitor the temperature of the environment. A force sensor can be included with the other sensors 512,513 as well. The other sensors 512,513 can include one or more motion sensors. The one or more motion sensors can include one or more accelerometers or gyroscopes.

The one or more motion sensors can detect motion of the electronic device (100). The one or more motion sensors can be used to sense some of the gestures of a user as well. The one or more motion sensors can be used to determine the spatial orientation of the electronic device (100) as well in three-dimensional space by detecting a gravitational direction. The one or more motion sensors can also include an electronic compass to detect the spatial orientation of the electronic device (100) relative to the earth's magnetic field.

The other sensors 512,513 can also include a moisture sensor. The moisture sensor can be configured to detect the amount of moisture on or about the display (104) or the housing of the electronic device (100).

The other sensors 512,513 can also include a distance measurement sensor. The distance measurement sensor can perform distance determination operations such as measuring distances between objects situated within the environment (105) of the electronic device (100) in one or more embodiments. In other embodiments, the distance measurement sensor can determine changes in distances between the electronic device (100) and objects situated within the environment (105). Combinations of these operations can be performed as well.

This list of sensors suitable for inclusion with the one or more sensors 501 along with the one or more microphones 503 and one or more imagers 502 is illustrative only. Numerous other sensors suitable for inclusion as the other sensors 512,513 will be obvious to those of ordinary skill in the art having the benefit of this disclosure.

In one or more embodiments, a context engine 514 can be operable with the one or more sensors 501 to detect, infer, capture, and otherwise determine persons and actions that are occurring in an environment (105) about the electronic device (100). For example, where included one embodiment of the context engine 514 determines assessed contexts and frameworks using adjustable algorithms of context assessment employing information, data, and events. These assessments may be learned through repetitive data analysis. Alternatively, a user may employ the user interface to enter various parameters, constructs, rules, and/or paradigms that instruct or otherwise guide the context engine 514 in determining whether media content captured by the one or more sensors 501 is private media content or other than private media content, e.g., normal, public, or sharable media content. Additionally, the context engine 514 can process media content captured by the one or more sensors 501 to determine multi-modal social cues, emotional states, moods, and other contextual information. The context engine 514 can comprise an artificial neural network or other similar technology in one or more embodiments.

In one or more embodiments, the context engine 514 is operable with the one or more processors 504. In some embodiments, the one or more processors 504 can control the context engine 514. In other embodiments, the context engine 514 can operate independently, delivering information gleaned from media content captured by the one or more sensors 501 to determine whether the media content is public media content or private media content. The context engine 514 can receive data from the one or more sensors 501. In one or more embodiments, the one or more processors 504 are configured to perform the operations of the context engine 514.

In one or more embodiments, the schematic block diagram 500 includes a storage device, such as one or more memories. In the illustrative embodiment of FIG. 5, the block diagram schematic 500 includes two separate and distinct storage devices, namely, a private data store 515 and a public data store 516. Media content captured by the one or more sensors can be stored in either the private data store 515 or the public data store 516 depending upon whether the media content is designated to be, such as via user input delivered to the user interface, or alternatively determined to be, such as by media content or contextual analysis performed by the one or more processors 504, the context engine 514 or another component, private media content 519 or public media content 518. Ordinary images, texts, and spoken words may be considered to be public media content 518, while content incorporating financial information, medical data, social security numbers, and so forth, may be considered to be private media content 519.

In one or more embodiments, the one or more processors 504 control a switch 517 or other gating device that can selectively couple sensors of the one or more sensors 501 to either the private data store 515 or the public data store 516 depending upon whether the one or more sensors 501 are operating in a normal mode of operation or a privacy mode of operation. When, for example, an imager of the one or more imagers 502 and a microphone of the one or more microphones 503 is operating in the privacy mode of operation and capturing private media content 519, in one or more embodiments the one or more processors 504 will toggle the switch 517 or other gating device to cause the private media content 519 to be captured in the private data store 515. In one or more embodiments, the one or more processors 504 then preclude transmission of private media content 519 from the private data store 515 to other electronic devices.

By contrast, when an imager of the one or more imagers 502 and a microphone of the one or more microphones 503 is operating in a normal, public, or sharable mode of operation and capturing normal or public media content 518 that can be shared without restriction, in one or more embodiments the one or more processors 504 will toggle the switch 517 or other gating device to cause the public media content 518 to be captured in the public data store 516. In one or more embodiments, the one or more processors 504 then permit transmission of public media content 518 from the public data store 516 to other electronic devices.

Embodiments of the disclosure contemplate that an authorized user of the electronic device (100) may attempt to share private media content 519 stored in the private data store 515. Illustrating by example, a user interface of the electronic device (100) can receive user input requesting transmission of the private media content 519 to another electronic device, such as a cloud server 506, which can be a social media server, another portable electronic device 507, or another type of device. For example, the authorized user may request that the private media content 519 be transmitted across a network 508 to be posted at a cloud server 506 operating as a social media service server. Accordingly, the authorized user would deliver user input to the user interface, e.g., display (104), requesting that the private media content 519 be transmitted across the network 508 to the cloud server 506 for posting at the social media site.

It should be noted that the "other electronic device" could be any of a number of electronic devices. For example, in one embodiment, the other electronic device comprises a portable electronic device 507, such as the candy bar style smartphone shown in FIG. 5, or a computer, tablet computer, or other device that belongs to a friend, stranger, or other acquaintance of the authorized user. In other embodiments, the other electronic device is a server. The server could be a cloud server 506 that provides backup data storage for the electronic device (100), a social media server, a personal server, web server, a social media server, commercial server, private server, institutional server, academic server, non-profit server, or other type of server configured to receive media content from electronic devices across the network. Other examples of electronic devices to which media content may be transmitted in accordance with embodiments of the disclosure will be obvious to those of ordinary skill in the art having the benefit of this disclosure.

Since the media content attempting to be shared in this example is private media content 519 stored in the private data store 515, the one or more processors 504 default to precluding transmission of the private media content 519 from the private data store 515 to any other electronic device. However, embodiments of the disclosure contemplate that the authorized user may elect, after the private media content 519 is stored in the private data store 515, to share the media content anyway. Embodiments of the disclosure can accommodate this request in multiple ways.

For example, the one or more processors 504 can retag the private media content 519 as being public media content 518, and can move the previously designated private media content 519 to the public data store 516 as newly designated public media content 518, which can be freely shared with other electronic devices via the communication circuit 505. Alternatively, the electronic device (100) can include a gating control 520 that selectively allows private media content 519 to be shared from the private data store 515 under certain conditions. In either situation, additional authorization is required to override the default state of the one or more processors 504 precluding transmission of the private media content 519 form the private data store 515.

In one embodiment, since the default mode of the electronic device (100) prevents the private media content 519 from being shared from the private data store 515, the one or more processors 504 prevent any applications from accessing the private media content 519. However, in one or more embodiments this default mode of operation can be overridden when additional authorization is provided in response to the user input requesting transmission of the private media content 519 from the private data store 515.

For example, in response to the user input requesting transmission of the private media content 519 from the private data store 515, the one or more processors 504 of the electronic device (100) may present a prompt on the display (104) requesting additional authorization prior to either converting the private media content 519 to public media content 518 or causing the gating control 520 to selectively transmit the private media content 519 to the other electronic device. The additional authorization may be in the form of a personal identification number (PIN), of which entry is required prior to any transmission. It should be noted that a PIN is merely one form of additional authorization necessary to override the default mode of operation in which the one or more processors 504 preclude transmission of the private media content 519 to any other electronic devices. In other embodiments, the additional authorization will comprise entry of a password, actuation of a user actuation target on the user interface, performance of a gesture on, or near, the user interface of the electronic device (100), making a gesture translating the electronic device (100) in three-dimensional space, voice command, voice identification, or some other manipulation of the electronic device (100) in response to the prompt. Other forms of additional authorization will be obvious to those of ordinary skill in the art having the benefit of this disclosure.

In other embodiments, the additional authorization may comprise authentication information corresponding to the authorized user of the electronic device (100). Illustrating by example, the one or more processors 504 of the electronic device (100) may require biometric information to be received by the one or more sensors 501 such as a fingerprint, iris scan, face scan, facial image, voice print, or another authenticator confirming that the person delivering the request to transmit the private media content 519 from the private data store 515 to the other electronic device is indeed the authorized user of the electronic device (100). Other examples of additional authorization will be described below. Still others will be obvious to those of ordinary skill in the art having the benefit of this disclosure.

In one or more embodiments, the prompt presented in response the request to transmit the private media content 519 from the private data store 515 can include a message comprising an indicator explaining why the one or more processors 504 of the electronic device (100) are, in the default mode, precluding the transmission of the private media content 519 from the private data store 515 in response to the request. For instance, the message may state, "This media content has been designated as private media content and is stored in the private data store. Sharing blocked! If you're sure you want to share, please enter PIN."

Presuming the authorized user enters the additional authorization required to override the default mode in which transmission of private media content from the private data store is precluded, the system can respond in one of two ways. First, the one or more processors 504 of the electronic device (100) can cease, in response to receiving the additional authorization to transmit the private media content 519 to the other electronic device precluding the transmission of the selected private media content 519 to the other electronic device by causing the gating control 520 to allow the communication circuit 505 to transmit the selected private media content 519 to the other electronic device.

In another embodiment, such as when the gating control 520 is omitted, the one or more processors 504 can retag the private media content 519 as being public media content 518. Thereafter, the one or more processors 504 can move the previously designated private media content 519 to the public data store 516 as newly designated public media content 518. Once the previously designated private media content 519 is moved to the public data store 516 as newly designated public media content 518, the one or more processors 504 would permit the transmission of the media content to other electronic devices freely in one or more embodiments.

Embodiments of the disclosure contemplate that the opposite situation can arise as well, namely, one in which previously designated public media content 518 is later designated to be private media content 519. When this occurs, if the public data store 516 resides only within the electronic device (100), the one or more processors 504 can simply retag the public media content 518 as private media content 519 and move the previously designated public media content 518 to the private data store 515 as newly designated private media content 519.

However, as noted above, the public data store 516 need not reside solely in the electronic device (100). There may be one public data store 516 situated in the electronic device (100). However, the authorized user may desire for all media content stored in the public data store 516 to be backed up to a cloud server 506. This would result in the cloud server 506 including an extension, copy, or other portion of the public data store 516. (Private media content 519 stored in the private data store 515 would be precluded from any such backup when the electronic device (100) is operating in the default mode of operation. For instance, in one or more embodiments the private data store 515 is highly encrypted and/or secured.)

Where this is the case, the one or more processors 504 may need to perform multiple steps in response to any user input delivered to the user interface redesignating previously designated public media content 518 as newly designated private media content 519. These additional steps can include one or more of retrieving the newly designated private media content 519 from the cloud server 506, initiating a deletion request of the newly designated private media content 519 from the cloud server 506, movement of the newly designated private media content 519 from the cloud server 506 to the private data store 515. Once these steps are complete, attempts to transmit the newly designated private media content 519 would be blocked as previously described.

The block diagram schematic 500 of FIG. 5 also includes one or more optional media content tagging engines. For example, the one or more imagers 502 can be operable with an imager media content tagging engine 521, while the one or more microphones 503 are operable with a microphone media content tagging engine 522, and so forth. When a single microphone/imager set is operable both in a normal mode of operation and a privacy mode of operation, so too can be the imager media content tagging engine 521 and the microphone media content tagging engine 522.

In one or more embodiments, after the authorized user of the electronic device (100) captures media content using the one or more sensors 501, the authorized user is provided with an option to tag, e.g., using the imager media content tagging engine 521 and the microphone media content tagging engine 522, the media content as either public media content 518 or private media content 519. If the user fails to tag the media content as either public media content 518 or private media content 519, in one or more embodiments the default tag is as public media content 518. (As mentioned above, the system can be configured in the opposite manner if desired, i.e., where the system defaults to tagging the media content as private media content 519 in response to user-defined system preferences or settings.) In one or more embodiments, if the authorized user designates the media content as being private media content 519, it is stored in the private data store 515. Otherwise, it is stored in the public data store 516.

In other embodiments, the one or more processors 504 and/or the context engine 514 may perform analyses to designate the media content as being either private media content 519 or public media content 518. Illustrating by example, using the imager media content tagging engine 521 and the microphone media content tagging engine 522, device context could also be considered such as whether the media content was captured at home or work, with either case having associated therewith certain public or private designations. The imager media content tagging engine 521 and the microphone media content tagging engine 522 may tag the media content as being private media content 519 if captured at home, but may tag the media content as being public media content 518 if captured at work, for example. Alternatively, as will be described below with reference to FIG. 10, the imager media content tagging engine 521 and the microphone media content tagging engine 522 may tag the media content as being public media content 518 or private media content 519 in response to user input delivered to the display (104), voice input, speech recognition, imager analysis, location data, and so forth. In an alternate embodiment, the imager media content tagging engine 521 and the microphone media content tagging engine 522 may tag the media content as being private media content 519 or public media content 518 causing it to automatically be stored in private data store 515 or public data store 516. For example, the authorized user speaking before the one or more sensors 501 capture the media content, combined with automatic speech recognition analysis, could also indicate level of privacy requested such that the media content is routed to the proper data store.

In one or more embodiments, when the media content is designated as private media content 519, the various tagging engines, e.g., the imager media content tagging engine 521 and the microphone media content tagging engine 522, are only permitted to tag the private media content 519 with information received by the one or more sensors 501. They would, for example, be able to tag the private media content 519 with location data received by a location sensor, time of day information received from a clock, but would not, for example, be allowed to tag the private media content 519 with data received from a cloud server 506. If, for example, the media content was captured at Buster and Mac's restaurant, and was designated as private media content 519, the imager media content tagging engine 521 and the microphone media content tagging engine 522 may be able to tag the private media content 519 with geographic coordinates received from a location detector, but not with the name of the restaurant if that information needed to be retrieved from a remote electronic device. By contrast, when media content is designated as public media content 518, the tagging engines could tag the public media content 518 using data from any source in one or more embodiments.

It should be noted that media content is not limited to images, sounds, and video captured by one or more imagers 502 and one or more microphones 503. The media content can also comprise captured screenshots, captured text messages, captured emails, or any content that can be captured by the one or more sensors 501. Other examples of media content will be obvious to those of ordinary skill in the art having the benefit of this disclosure.

Accordingly, in one or more embodiments the system of FIG. 5 elevates personal data security and user privacy pertaining to captured media content. In one or more embodiments, the electronic device (100) includes a default mode and an override mode. In the default mode, private media content 519 is stored in a private data store 515 and is precluded from being transmitted from the private data store 515 to another electronic device. In one or more embodiments, if the authorized user overrides the private restriction for sharing with a friend, the shared media is tagged private by the electronic device (100) so that the friend receiving the media is informed of its private nature and treats it with confidentiality.

In the override mode, when the authorized user attempts to share media content designated as being private, such as by launching an application like a messaging application or social media application, the one or more processors 504 block the media content from being inserted into the message or posted to the social media site. In one or more embodiments, the one or more processors 504 alert the authorized user, in response to any requests to transmit private media content 519, that a higher level of authorization or authentication, such as the entry of a PIN, is required to confirm the authorized user's intent to share the private media content that is otherwise precluded from transmission. When this additional authorization is received, in one or more embodiments the private media content 519 can be transmitted to the other electronic device.

Turning now to FIG. 6, illustrated therein is another schematic block diagram 600 for the electronic device (300) of FIGS. 3-4, which include physically separated private and public sensors instead of the dual-mode sensors of FIG. 5. Many of the components, such as the one or more processors 604, the communication circuit 605, the public data store 616, the private data store 615, and the optional gating control 620 function substantially in the same way that they did with reference to the schematic block diagram (500) of FIG. 5. For example, in one or more embodiments the one or more processors 604 store public media content 618 in the public data store 616 and permit transmission of the public media content 618 to other electronic devices via the communication circuit 605. By contrast, private media content 619 is stored in the private data store 615 an dis precluded from transmission from the private data store 615 to other electronic devices in a default mode of operation. The various processors systems can work with the one or more sensors 601 in a manner similar to that described above with reference to FIG. 5 as well.

However, the one or more sensors 601 are different in the schematic block diagram 600 of FIG. 6 than are the one or more sensors (501) of the schematic block diagram (500) of FIG. 5. Rather than using dual mode sensors, each sensor is separated into a public sensor and a separate and physically distinct private sensor. For example, the one or more microphones 603 are separated into one or more public microphones 624 that are physically separate and distinct from one or more private microphones 623. Similarly, the one or more imagers 602 are separated into one or more public imagers 626 that are physically separate and distinct from one or more public imagers 626. The one or more private sensors are operable to capture private media content 619 for storage in the private data store 515, while the one or more public sensors are operable to capture public media content 618 for storage in the public data store 616.

In one or more embodiments, there are an equal number of private sensors and public sensors. If, for example, the one or more public imagers 626 comprise a front-facing public imager and a rear-facing public imager, the one or more private imagers 625 would comprise a front-facing private imager and a rear-facing private imager as described above with reference to FIGS. 3-4. The same may be true with respect to the one or more microphones 603. However, in other embodiments, there will be different numbers of public and private imagers and/or microphones. There may be a rear-facing public imager, rear-facing private imager, rear-facing public microphone, and rear facing private microphone, while the front side of the device includes only front-facing public imager and front-facing public microphone, for example Other configurations will be obvious to those of ordinary skill in the art having the benefit of this disclosure.

In one or more embodiments, rather than having a single imager and/or microphone, here the block diagram schematic 600 includes dual sensors that are each operable in a dedicated mode of operation. In this embodiment, the one or more imagers 602 and one or more microphones 603 comprise at least one private imager 625 and at least one private microphone 623, which are configured to capture only private media content 619. In one or more embodiments, the at least one private imager 625 and at least one private microphone 623 can be hardwired or otherwise operatively coupled to the private data store 615, thereby ensuring that all private media content 619 captured by at least one private imager 625 and at least one private microphone 623 is securely stored only in the private data store 615.

In this illustrative embodiment, the schematic block diagram 600 also includes additional sensors. For example, in this embodiment the one or more imagers 602 and one or more microphones 603 comprise at least one public imager 626 and at least one public microphone 624. In one or more embodiments, the at least one public imager 626 and at least one public microphone 624 are physically and electrically independent from the at least one private imager 625 and at least one private microphone 623, and are configured to capture only public, i.e., sharable with others, media content.

In one or more embodiments, the at least one public imager 626 and at least one public microphone 624 are operatively coupled to a public data store 616. As noted above, the public data store 616 can reside wholly within the electronic device (300), partially within the electronic device (300) and partially within another electronic device, e.g., cloud server 606, or exclusively outside the electronic device (300), e.g., exclusively in the cloud server 606. In one or more embodiments, one or more processors 604 of the electronic device (300) permit media content captured by the at least one public imager 626 and at least one public microphone 624 to be shared with other electronic devices from the public data store 616. This sharing can include transmitting the public media content 618 directly to the other electronic device, e.g., via text or multimedia message, by posting the public media content to third party servers, e.g., social media servers, or by other techniques.

In effect, at least one private imager 625 and at least one private microphone 623 process captured media content by storing the media content in the dedicated and secure storage of the private data store 615 only, with the one or more processors 604 precluding transmission of this private media content 619 to other electronic devices. By contrast, the at least one public imager 626 and at least one public microphone 624 process captured media content by storing the media content in the public data store 616, where sharing with other electronic devices, including cloud servers, social media servers, or other electronic devices is permitted.

In one or more embodiments, when a pending media content capture operation is designated as being a private media content capture event, e.g., when an authorized user of the electronic device (300) actuates a media content capture application and designates the media content capture operation as being private, the one or more processors 604 actuate the at least one private imager 625 and at least one private microphone 623. The one or more processors 604 can also optionally disable the at least one public imager 626 and at least one public microphone 624.

Upon capturing the media content, the fact that the at least one private imager 625 and at least one private microphone 623 have a dedicated operative coupling to the private data store 615 results in the captured media content being stored only within the electronic device (300), i.e., only within the private data store 615 that resides within the confines of the housing of the electronic device (300). In one or more embodiments, the one or more processors 604 then preclude transmission of the private media content 619 from the private data store 615 to other electronic devices. This results in sharing or posting to social media being blocked.

As with the system of FIG. 6, in one or more embodiments the one or more processors 604 can alert the user in response to share attempts by presenting a notification on the display (304) of the electronic device (300) indicating that the media content attempting to be shared is private media content 619. The one or more processors 604 can optionally request for additional authentication credentials to override this preclusion that, when entered, cause the captured media content to transition from private media content 619 to public media content 618. This results in the media content being transferred out of the private data store 615 and into the public data store 616, where it can freely be shared. In one or more embodiments, when the media content is shared it is tagged with a note indicating that despite it having been shared, the authorized user still considers it to be confidential. (Alternatively, the optional gating control 620 can selectively share the private media content 619 as previously described.) In one or more embodiments, when the captured media content is private media content 619, tagging of the media content as being private occurs only within the electronic device (300). This means that cloud servers, remote services, e.g., location detection services, etc., are not used in the tagging process.

In one or more embodiments, when a pending media content capture operation is designated as being a normal media content capture event, e.g., when an authorized user of the electronic device 300 actuates a media content capture application and does not designate the media content capture operation as being private, the one or more processors 604 actuate the at least one public imager 626 and at least one public microphone 624. The one or more processors can also optionally disable the at least one private imager 625 and at least one private microphone 623.

Upon capturing the media content, the one or more processors 604 store the captured media content in the public data store 616. In one or more embodiments, the one or more processors 604 permit transmission of this public media content 618 from the public data store 616 to other electronic devices. Accordingly, the authorized user of the electronic device (300) can freely share the public media content 618 with others, post the public media content 618 to social media, and so forth.

In one or more embodiments when, for whatever reason, captured media content is initially designated as, or determined to be, normal, sharable, or public media content, but is then later marked as private media content, the one or more processors 604 can take action to remove the private media content 619 from the public data store 616 and transfer it to the private data store 615. Illustrating by example, if the public data store 616 includes storage in the cloud server 606, and the authorized user of the electronic device (300) changes the privacy marking to designate the captured media content as private media content 619, the one or more processors 604 can reverse the public data store storage process.

In one or more embodiments, this reversal results in the media content being retrieved from the cloud server 606 by the one or more processors 604. The one or more processors 604 may also initiate a deletion request causing the media content to be deleted from the cloud server 606. The one or more processors 604 may also send a deletion request to the owner of another electronic device receiving the media content when the authorized user of the electronic device (300) has no control over or making sure media reaches intended recipient by requesting authentication on friend device to be able to view content. The one or more processors 604 can then store the media content in the private data store 615. As such, this reversal results in the media content no longer being sharable from the electronic device (300). Optionally, when sharing of private media content 619 is attempted, the one or more processors 604 can request additional authorization to override the sharing block as previously described. For instance, the one or more processors 604 may actuate a biometric sensor 614 such as a facial depth scanner to obtain additional authorization to override the sharing block and return the private media content 619 to the public data store 616.

Figure 7:
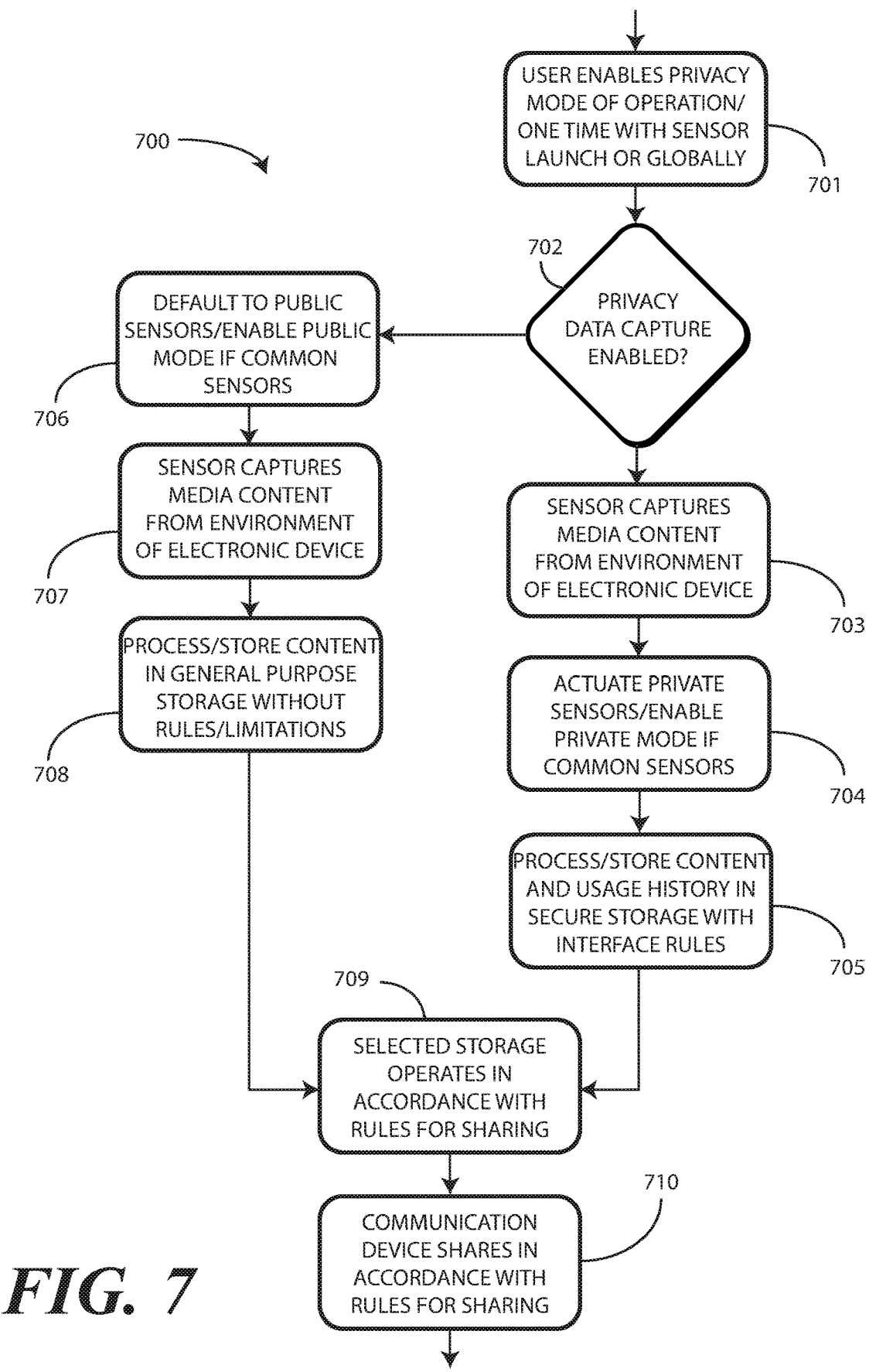
FIG. 7 illustrates one explanatory method in accordance with one or more embodiments of the disclosure.

Now that various hardware components have been described, attention will be turned to methods of using electronic devices in accordance with one or more embodiments of the disclosure. Turning now to FIG. 7, illustrated therein is one explanatory method 700 for the electronic devices (100,300) of FIGS. 1-4. More detailed methods will be described thereafter with reference to subsequent figures.

At step 701, a user of an electronic device optionally enables a privacy mode of operation. This step 701 can occur in a variety of ways. In one or more embodiments, step 701 occurs when the authorized user delivers user input to a user interface of the electronic device. For example, the authorized user may launch an imager application and designate the image capture operation that will be performed by the imager application as a private image capture operation. In another embodiment, the authorized user may cause global enablement of the privacy mode of operation using a menu or device settings. In still another embodiment, where the electronic device is equipped with speech recognition, the user speaks a command, such as "take a private video," which causes the electronic device to enter the privacy mode of operation. Other techniques for enabling the privacy mode of operation will be obvious to those of ordinary skill in the art having the benefit of this disclosure.

Decision 702 then determines whether the privacy mode of operation was enabled at step 701. Where it was, the method 700 deems the captured media content to be private media content. At step 703, the method 700 configures the electronic device to capture private media content. This can occur in multiple ways.

Where the electronic device includes dual mode sensors, such in FIG. 5 above, in one or more embodiments this results in the one or more imagers and one or more microphones being placed in the privacy mode of operation with the switch or other gating device operatively coupling the one or more imagers and one or more microphones to the private data store. Where the electronic device includes one or more dedicated private imager/microphones and one or more dedicated public imager/microphones, such as in FIG. 6 above, this step 701 can result in enablement of the one or more dedicated private imager/microphones and deactivation of the one or more dedicated public imager/microphones.

At step 704, the one or more sensors capture the private media content from the environment of the electronic device. At step 705, one or more processors of the electronic device store the private media content in the private data store situated within the electronic device. In one or more embodiments, the private media content is stored at step 705 with tagged information and metadata, which can include the usage history occurring when the private media content was captured. The storage occurring at step 705 occurs in accordance with any interface rules the authorized user may have designated for the private data store in one or more embodiments.

Where the authorized user fails to enable the privacy mode of operation at step 701, as determined at decision 702, in one or more embodiments the one or more processors of the electronic device default to the normal mode of operation where media content captured by the sensors is presumed to be publically shareable. At step 706, the method 700 configures the electronic device to capture public media content. This can occur in multiple ways.

Where the electronic device includes dual mode sensors, in one or more embodiments step 706 comprises the one or more imagers and one or more microphones being placed in the normal mode of operation with the switch or other gating device operatively coupling the one or more imagers and one or more microphones to the public data store. Where the electronic device includes one or more dedicated private imager/microphones and one or more dedicated public imager/microphones, this can result in deactivation of the one or more dedicated private imager/microphones and actuation or enablement of the one or more dedicated public imager/microphones.

At step 707, the one or more sensors capture the public media content from the environment of the electronic device. At step 708, one or more processors of the electronic device store the public media content in the public data store situated within the electronic device. In one or more embodiments, the public media content is stored at step 708 with tagged information and metadata, which can include the usage history occurring when the public media content was captured. The storage occurring at step 708 occurs in accordance with any interface rules the authorized user may have designated for the public data store in one or more embodiments.

At step 709, the one or more processors of the electronic device implement sharing rules for both the private data store and the public data store. Where the captured media content is private media content, step 709 comprises the one or more processors precluding transmission of the private media content from the private data store to another electronic device. By contrast, where the captured media content comprises normal, public, or sharable media content, step 709 comprises the one or more processors permitting transmission of the media content to other electronic devices, which occurs at step 710.

As noted above, embodiments of the disclosure contemplate that an authorized user of the electronic device may attempt to share private media content stored in the private data store. For example, the authorized user may request that the private media content be transmitted across a network to be posted at a social media service server. Since the media content attempting to be shared is private media content stored in the private data store, at step 709 the one or more processors default to precluding transmission of the private media content from the private data store to any other electronic device.

However, embodiments of the disclosure contemplate that the authorized user may elect, after the private media content is stored in the private data store, to share the media content anyway by entering additional authorization credentials that either change the private media content to public media content or cause a gating control to transmit the media content. Where this has occurred, step 710 can comprise the formerly private media content being transmitted to another electronic device.

Thus, in the method 700 of FIG. 7, step 701 optionally comprises receiving, at a user interface of the electronic device prior to capturing any media content, user input designating media content as private media content. Where no such designation is received at step 701, in one or more embodiments, the method defaults to a designation that the media content is non-private, i.e., is other than private media content, public media content, sharable media content, and so forth.

Where the electronic device is equipped with dual mode sensors and the media content is designated as private media content, step 703 can comprise the one or more processors operatively coupling the output(s) of the dual mode sensors to the private data store. By contrast, where the electronic device is equipped with one or more dedicated private sensor groups, e.g., a dedicated private imager/microphone pair, and one or more dedicated public sensor groups, e.g., a dedicated public imager/microphone pair, step 703 comprises enabling, by the one or more processors, at least one sensor of the electronic device operable to capture the media content, e.g., the dedicated private imager/microphone pair, thereby allowing the at least one sensor of the electronic device to capture the media content, and disabling, by the one or more processors, at least one other sensor of the electronic device operable to capture the media content, e.g., the dedicated public imager/microphone pair, thereby precluding the at least one other sensor from capturing the media content.

Where the electronic device is equipped with dual mode sensors and the media content is designated as public media content, step 706 can comprise the one or more processors operatively coupling the output(s) of the dual mode sensors to the public data store. By contrast, where the electronic device is equipped with one or more dedicated private sensor groups and one or more dedicated public sensor groups, step 706 can comprise enabling, by the one or more processors, at least one sensor of the electronic device operable to capture the media content, e.g., the dedicated public imager/microphone pair, thereby allowing the at least one sensor of the electronic device to capture the media content, and disabling, by the one or more processors, at least one other sensor of the electronic device operable to capture the media content, e.g., the dedicated private imager/ microphone pair, thereby precluding the at least one other sensor from capturing the media content.

One or more sensors capture media content from an environment of the electronic device at steps 704,707. One or more processors determine, at decision 702, whether the media content is private media content. When the media content is private media content, step 705 comprises the one or more processors storing the private media content in the private data store situated within the electronic device, with step 709 precluding—at least in the default mode of operation before additional authorization overriding this mode is received—transmission of the private media content from the private data store to another electronic device.

By contrast, when the media content is other than private media content, e.g., when the captured media content is normal media content, public media content, sharable media content, or other non-private media content, the one or more processors store the media content in the public data store at step 708. The one or more processors permit, at step 709, transmission of the media content to another electronic device, which occurs via the communication circuit at step 710.

Figure 8:
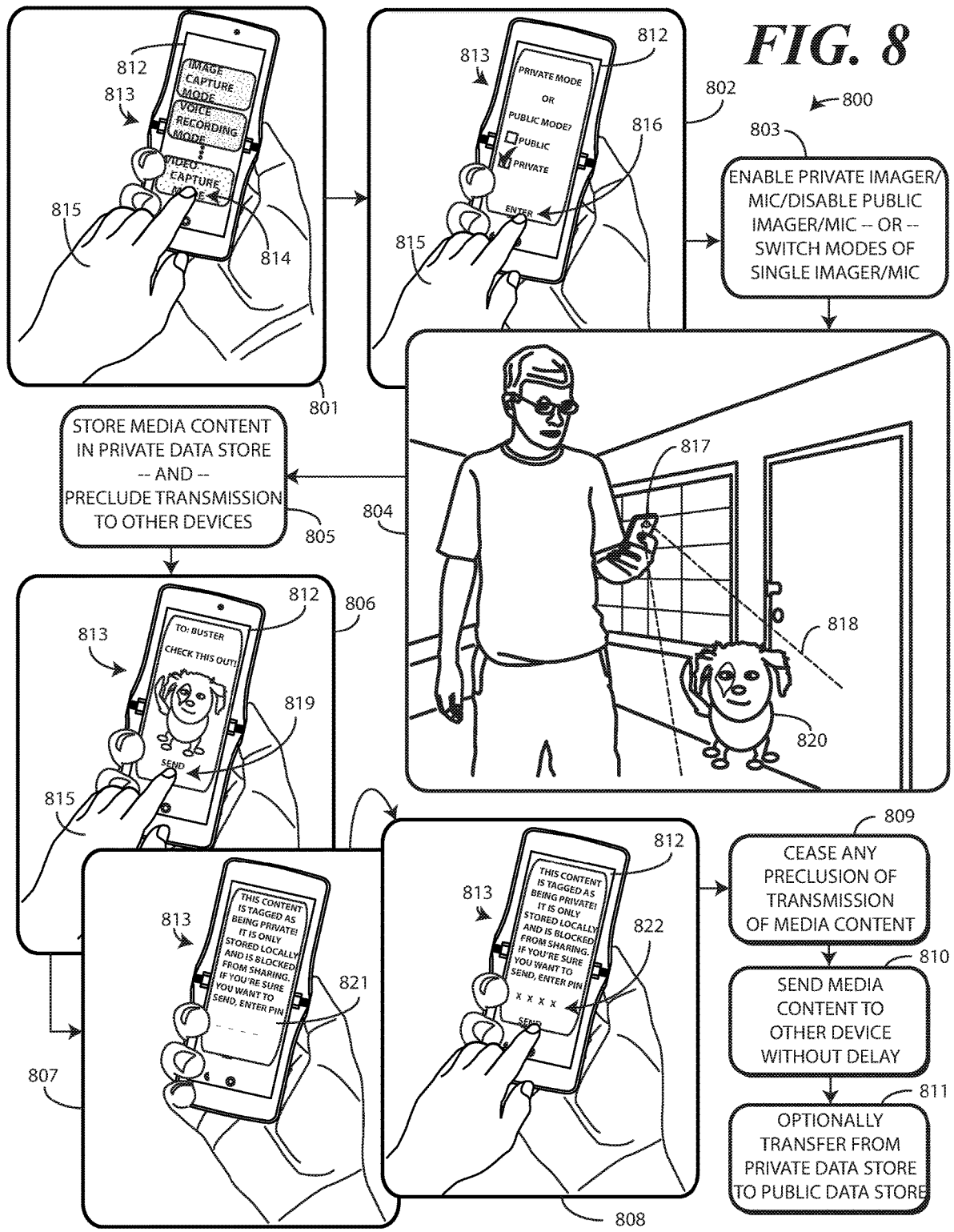
FIG. 8 illustrates another explanatory method in accordance with one or more embodiments of the disclosure.

Turning now to FIG. 8, illustrated therein is another method 800 in accordance with one or more embodiments of the disclosure. Beginning at step 801, an authorized user 815 of an electronic device 813 is shown holding the electronic device 813. In one or more embodiments, the electronic device 813 comprises one or more sensors operable to capture media content from an environment of the electronic device. The one or more sensors could be dual mode sensors such as those shown above in FIG. 5, or alternatively physically separate, dedicated public and private sensors as shown above in FIG. 6.

In one or more embodiments the electronic device 813 also includes one or more processors, operable with the one or more sensors. In one or more embodiments, the one or more processors can determine whether the media content to be captured is private media content or other than private media content, e.g., public media content. This determination can be made from user input 816, such as that received at step 802, or alternatively using any of the techniques described below with reference to FIG. 10. Other techniques for determining whether media content is private media content or public media content will be obvious to those of ordinary skill in the art having the benefit of this disclosure.

In one or more embodiments, the electronic device 813 includes a private data store and a public data store as previously described. In one or more embodiments, the private data store is situated in the electronic device and operable with the one or more processors. The public data store is operable with the one or more processors and may be situated entirely within the electronic device 813, partially within the electronic device 813, or entirely outside the electronic device 813. Illustrating by example, in one or more embodiments the public data store can be situated at a cloud server in electronic communication with the electronic device across a network.

At step 801, a user interface 812 of an electronic device 813 is receiving user input 814 from an authorized user 815 initiating a media content capture operation. In this example, the authorized user 815 is delivering user input 814 launching a video capture application operable with one or more sensors of the electronic device 813.

At step 802, the user interface 812 is receiving user input 816 designating the media content to be captured in the media content capture operation as private media content. In this example, upon actuating the video capture application, the one or more processors of the electronic device 813 present a prompt on the user interface 812 requesting the user input 816 designating the media content as either private media content or public media content. The prompt states, "Private Mode or Public Mode?" In this example, the authorized user 815 has checked private mode, thereby informing the one or more processors that the one or more sensors should be placed in the privacy mode of operation.

In this example, the user input 816 designating the media content as private media content is received at the user interface 812 prior to the one or more sensors capturing the media content. However, in other embodiments step 802 could be moved between step 804 and step 805, thereby occurring after step 804. In such a scenario, the one or more processors would present, at the user interface 812 of the electronic device 813, but after the one or more sensors 817 capture the media content 818 and before the one or more processors determine whether the media content 818 is private media content, the prompt requesting user input designating the media content as the private media content. In either case, if the authorized user 815 fails to provide the user input 816 designating the media content 817 as the private media content, in one or more embodiments step 802 comprises designating the media content as the other than the private media content. Said differently, in one or more embodiments, upon failing to receive the user input designating the media content as the private media content, regardless of whether step 802 occurs before or after step 804, the one or more processors default to designating the media content as public media content.

At step 803, the one or more processors configure the electronic device 813 to capture private media content. Where the electronic device 813 is configured with the schematic block diagram of FIG. 6 above, i.e., where the one or more sensors comprise at least a first sensor operable to capture the media content when the user input 816 designates the media content as the private media content and at least a second sensor operable to capture the media content when the user input 816 fails to designate the media content as the private media content, step 803 comprises the one or more processors enabling the at least a first sensor and disabling the at least a second sensor in response to the user input 816. By contrast, where the electronic device 813 is equipped with dual mode sensors, step 803 comprises the one or more processors operatively coupling the output(s) of the dual mode sensors to the public data store or the private data store as a function of the user input 816 received at step 802.

At step 805, the one or more processors of the electronic device 813 store the media content 818 captured at step 804. Where the one or more processors determine, using the user input 816 of step 802, the techniques of FIG. 10, or other techniques, that the media content 818 is other than the private media content, e.g., that the media content 818 is public media content, the one or more processors would store the media content 818 in the public data store at step 805. The one or more processors would also permit transmission of the media content 818 to other electronic devices.

However, in this example the authorized user 815 designated the media content 818 as private media content in step 802. Accordingly, since the one or more processors determine that the media content 818 is private media content from the user input 816, at step 805 the one or more processors store the media content 818 in the private data store. In one or more embodiments, step 805 also includes the one or more processors precluding transmission of the media content 818 from the private data store to other electronic devices.

At step 806, the user interface 812 of the electronic device 813 receives user input 819 requesting transmission of the media content 818, which is now private media content stored in the private data store, requesting transmission of the private media content to another electronic device. In this example, the authorized user 815 has launched a text messaging application and is attempting to send the media content 818, which is a picture of the authorized user's dog 820, to a friend named Buster. The authorized user 815 is excited about the dog's antics, and includes the note, "Check this out!"

Since the media content 818 is private media content stored in the private data store, the one or more processors default to precluding transmission of the media content 818 to other electronic devices. However, in one or more embodiments the authorized user 815 can override this default mode of operation by providing additional authorization to the one or more processors.

At step 807, the one or more processors present, in response to the user input 819 received at step 806, a prompt 821 indicating that the private media content is precluded from transmission to other electronic devices. In some embodiments, this is all the prompt 821 would reveal, as embodiments of the disclosure can be configured without override capability to eliminate the preclusion of transmission of private media content to other electronic devices.

In this example, however, the electronic device 813 is equipped with the override option. Accordingly, the prompt 821 requests additional authorization to transmit the media content 818 to the other electronic device, which in this case would be a portable electronic device belonging to Buster. The prompt 821 states, "This content is tagged as being private. It is only stored locally and is blocked from sharing. If you're sure you want to send, enter PIN." Other examples of prompts requesting additional authorization to transmit the media content 818 to the other electronic device will be obvious to those of ordinary skill in the art having the benefit of this disclosure.

At step 808, the user interface 812 of the electronic device 813 receives the additional authorization 822 to transmit the private media content to the other electronic device in response to the prompt 821. At step 809, the one or more processors cease, in response to the additional authorization 822 to transmit the private media content to the other electronic device, precluding the transmission of the media content 818 to the other electronic device. At step 810, the one or more processors cause a communication circuit to transmit the media content to the other electronic device. The one or more processors can optionally transfer the media content 818 from the private data store to the public data store at step 811 since the authorized user 815 has indicated that the media content 818 is indeed appropriate for sharing.

Figure 9:
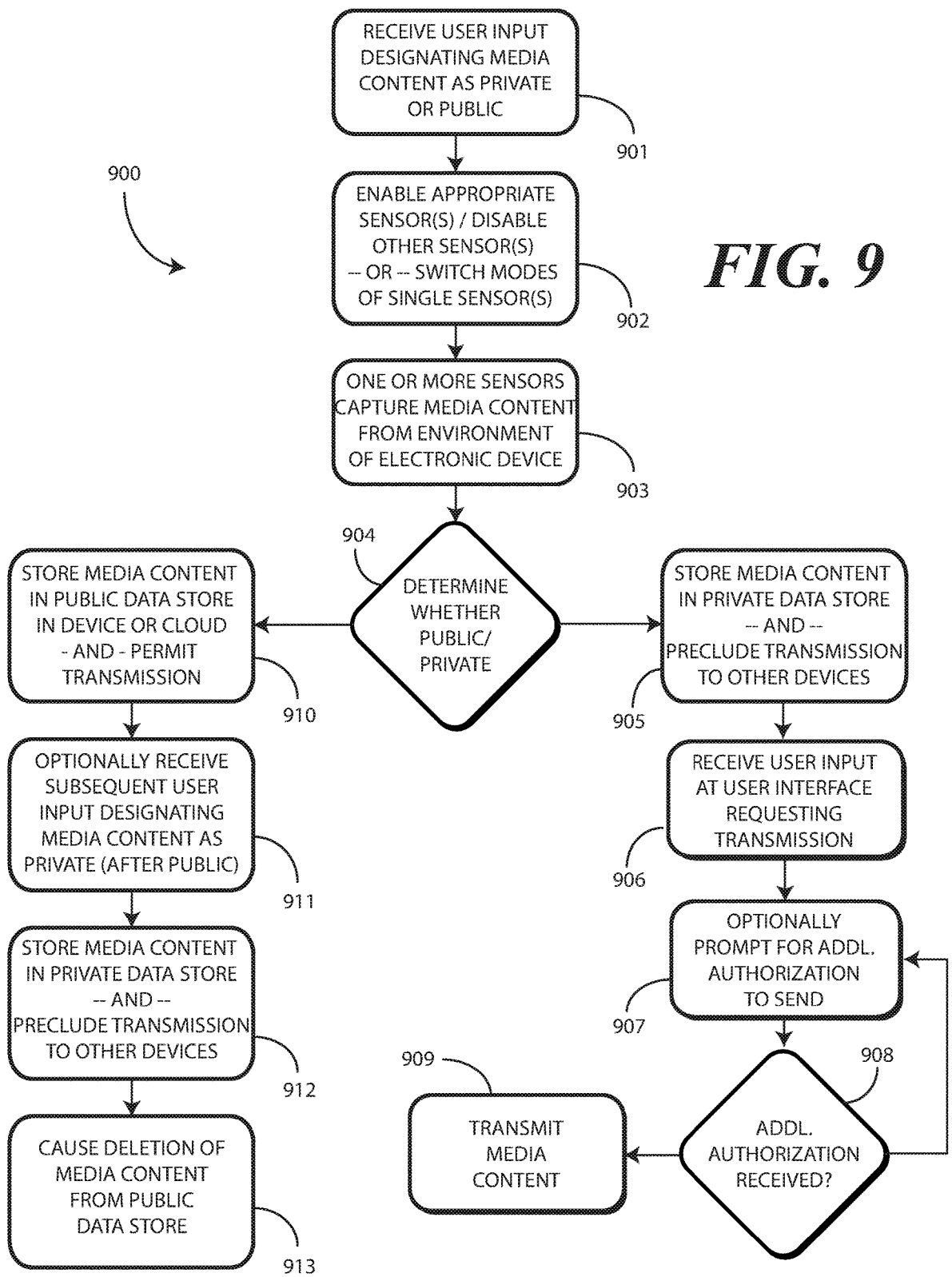
FIG. 9 illustrates still another explanatory method in accordance with one or more embodiments of the disclosure.

Turning now to FIG. 9, illustrated therein is another method 900 configured in accordance with one or more embodiments of the disclosure. Beginning at step 901, a user interface of an electronic device receives user input designating media content to be captured as being either public media content or private media content. In one or more embodiments, the user input received at step 901 occurs prior to one or more sensors of the electronic device capturing the media content.

At step 902, the one or more processors configure the electronic device to capture the media content. Since the electronic device could have dedicated public and private sensors, or alternatively dual mode sensors, this step 902 can occur in two different ways. Where the one or more sensors comprise at least a first sensor operable to capture the media content when the user input received at step 901 designates the media content as the private media content and at least a second sensor operable to capture the media content when the user input received at step 901 fails to designate the media content as the private media content, step 902 can comprise the one or more processors enabling the at least a first sensor and disabling the at least a second sensor in response to the user input received at step 901. By contrast, where the electronic device is equipped with dual mode sensors, step 902 can comprise the one or more processors operatively coupling the output(s) of the dual mode sensors to the public data store or the private data store as a function of the user input received at step 901.

Step 903 then comprises the one or more processors causing at least a first microphone and at least a first imager to capture the media content. If the media content is pre-designated as being private media content and the electronic device is equipped with separate private and public sensors, step 903 can comprise the one or more processors precluding at least a second microphone or a second imager from capturing the media content in response to the user input received at step 901.

At decision 904, the one or more processors determine whether the media content captured by the one or more sensors, here the at least a first microphone and at least a first imager, is private media content or public media content. In the illustrative example of FIG. 9, this would occur from the user input received at step 901. However, it could occur in other ways as well.

Figure 10:
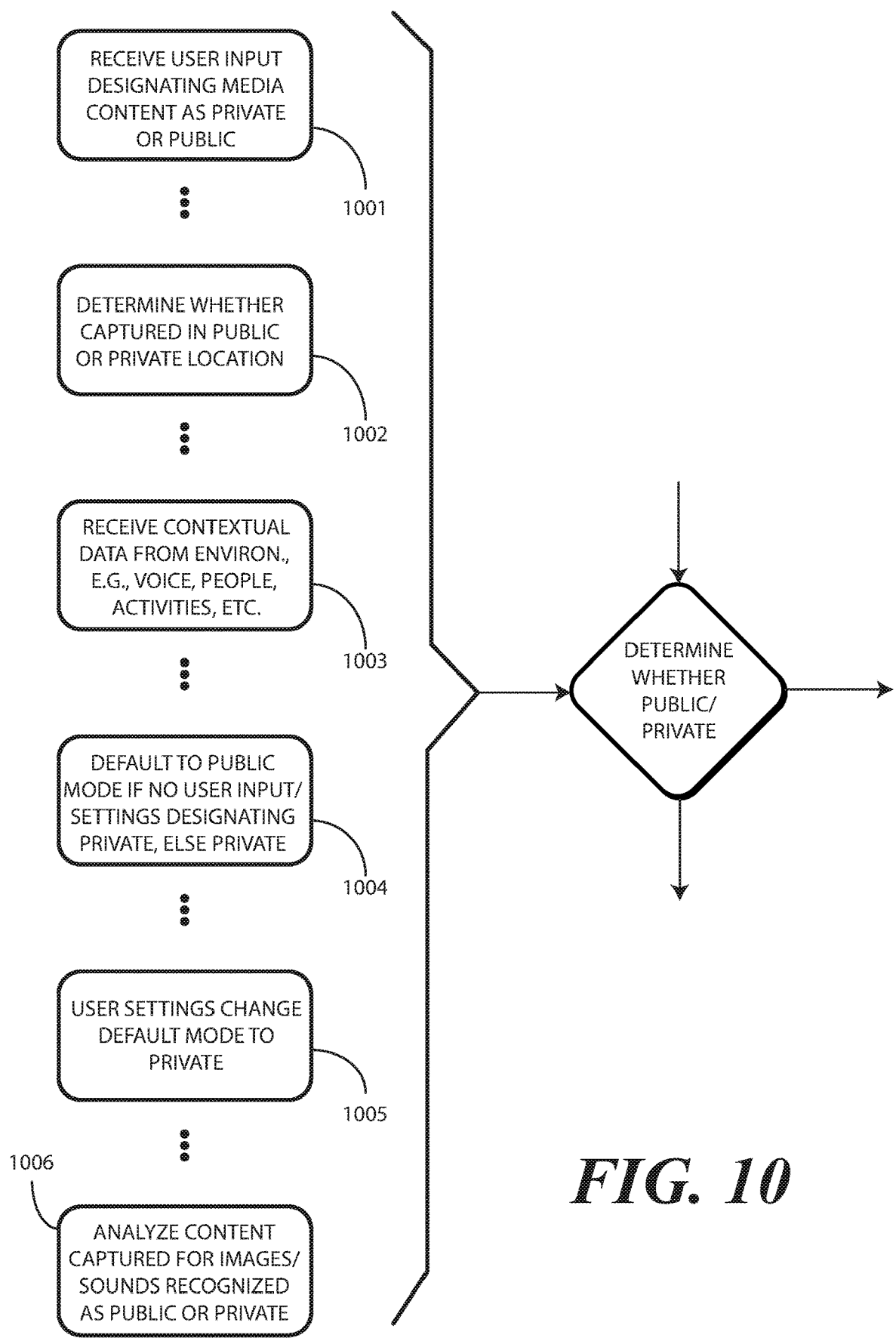
FIG. 10 illustrates various techniques for determining whether media content is public media content or private media content in accordance with one or more embodiments of the disclosure.

Turning briefly to FIG. 10, illustrated therein are various ways in which one or more processors of an electronic device can determine whether captured media content is public media content, suitable for sharing without restriction, or private media content, which would be stored in a private data store and precluded from transmission to other electronic devices. The techniques shown in FIG. 10 are illustrative only, as numerous others will be obvious to those of ordinary skill in the art having the benefit of this disclosure.

Beginning at step 1001, as was the case in FIG. 9, in one or more embodiments the one or more processors can determine whether the captured media content is public media content or private media content from user input. This user input could be received prior to capturing the media content or after capturing the media content, as described above with reference to FIG. 8.

Illustrating by example, in one or more embodiments the one or more processors of the electronic device could receive user input at the user interface designating the media content as private media content or public media content after the one or more sensors capture the media content, or even after the one or more processors store the media content in either the private data store or the public data store. For instance, step 1001 could comprise the one or more processors presenting, at a user interface of the electronic device after the one or more sensors capture the media content and before the one or more processors determine whether the media content is the private media content, a prompt requesting user input designating the media content as the private media content if the media content is the private media content. Upon receiving the user input designating the media content, for example, as the private media content, the one or more processors could determine whether the media content is the private media content occurs as a function of the user input. Alternatively, the user input received at step 901 could be received before the media content is captured, as in step (802) of FIG. 8 as drawn (rather than the alternate described).

At step 1002, a location detector operable with the one or more processors can determine a location of the electronic device when the one or more sensors capture the media content. Accordingly, step 1002 can allow the one or more processors to determine whether the media content is the private media content a function of the location of the electronic device when the one or more sensors capture the media content. If, for example, the electronic device is at a location of residence of an authorized user, one or more device settings may require that media content captured at home is always private media content. By contrast, if the media content is captured at work, the user settings may require the media content to be designated as public media content, and so forth.

At step 1003, one or more sensors can receive contextual data input from an environment of the electronic device. This contextual information can include sounds received from the environment of the electronic device, activities occurring in the environment of the electronic device, scenes, settings, moods, or other information. A context engine can process this contextual information to allow the one or more processors to infer whether the captured media content is public or private. A person doing yoga and monitoring their form may be inferred as being private media content, as the yogi may not want their form critiqued by others. By contrast, a children's baseball game in the front yard may be designated as public media content since passers by can see the action. Thus, in one or more embodiments step 1003 can comprise a context engine receiving contextual data from the environment of the electronic device while the one or more sensors capture the media content, with the one or more processors determining whether the media content is the private media content from the contextual data. Other examples of how contextual information can inform whether the captured media content is public media content or private media content will be obvious to those of ordinary skill in the art having the benefit of this disclosure.

At step 1004, the one or more processors may simply default to the presumption that all captured media content is public media content in the absence of instructions to the contrary. Said differently, in one or more embodiments at step 1004 the determining whether the media content captured by the one or more sensors is the private media content or the public media content can comprise designating the media content as the public media content in an absence of user input designating the media content as the private media content.

Illustrating by example, in one or more embodiments step 1004 comprises presenting at the user interface of the electronic device, either before after the one or more sensors capture the media content, and before the one or more processors determine whether the media content is the private media content, a prompt requesting user input designating the media content as the private media content. In one or more embodiments, step 1004 would designate the media content as the other than private media content, e.g., as public content, upon failing to receive the user input designating the media content as the private media content. At step 1005, these default settings can be changed using user settings and/or a control menu of the electronic device.

As stated above, if privately marked media content is changed to publicly marked media content by the authorized user, resulting in the media content being shared to another friend's electronic device, in one or more embodiments the settings defined at step 1005 also include confirming that the recipient is indeed a friend. For example, the settings defined at step 1005 can require transmitting a request for friend credentials to the friend. These credentials may include location information, device information, and so forth. The electronic device belonging to the friend can then transmit the credentials back with authorized user before the media content can be viewed. Thus, in one or more embodiments the settings defined at step 1005 result initially in transmission of a communication requesting credentials. Thereafter, once the credentials are provided, the settings defined at step 1005 can cause transmission of a second communication of media content, which follows automatically in one or more embodiments.

At step 1006, the media content itself can be analyzed to determine whether the captured media content is public media content or private media content. The one or more processors, or alternatively the analyzer/processor(s) associated with the sensors capturing the media content, can perform image analysis, audio analysis, voice analysis, or other analyses to determine whether the media content is public media content or private media content.

Turning now back to FIG. 9, at decision 904 the one or more processors of the electronic device determine whether the media content captured by the one or more sensors of the electronic device is private media content or public media content. In one or more embodiments, when the media content is the private media content, step 905 comprises storing the private media content in a private data store carried by the electronic device and precluding transmission of the private media content from the private data store to another electronic device. In one or more embodiments, when the media content is the public media content, step 910 comprises storing the public media content in a public data store, which could be situated at the electronic device, partially situated at the electronic device, or situated in the cloud or elsewhere outside the electronic device, and permitting transmission of the media content from the public data store to the another electronic device.

Embodiments of the disclosure contemplate that additional operations can occur after this storage and/or permission/preclusion of transmission is performed at steps 905 and 910. For example, when the media content is designated as being private media content, step 906 can comprise receiving, at a user interface, other user input requesting transmission of the private media content to the another electronic device. Step 907 an comprise presenting, in response to the other user input at the user interface, a prompt indicating that the private media content is precluded from transmission to the another electronic device. Optionally, step 907 can comprise the prompt requesting additional authorization to transmit the media content to the other electronic device, as well as receiving, at the user interface, the additional authorization to transmit the private media content to the other electronic device in response to the prompt. Decision 904 determines whether the additional authorization has been received. Where it has, step 909 comprises ceasing, by the one or more processors in response to the receiving the additional authorization to transmit the private media content to the another electronic device at step 907, the precluding the transmission of the media content to the other electronic device. Step 907 can also comprise causing, by the one or more processors in response to the ceasing, a communication device to transmit the media content to the other electronic device.

Where the media content is determined to be public media content, embodiments of the disclosure contemplate that the authorized user may change their mind. Accordingly, step 911 can comprise receiving, at a user interface of the electronic device after the storing the media content in the public data store, user input designating the media content as the private media content. Where this occurs, step 912 can comprise storing, by the one or more processors, the private media content in the private data store situated in the electronic device. Step 913 can then comprise causing, by the one or more processors, deletion of the media content from the public data store. As explained above, the opposite process can occur as well, with the media content being transferred from the public data store to the private data store.

Figure 11:
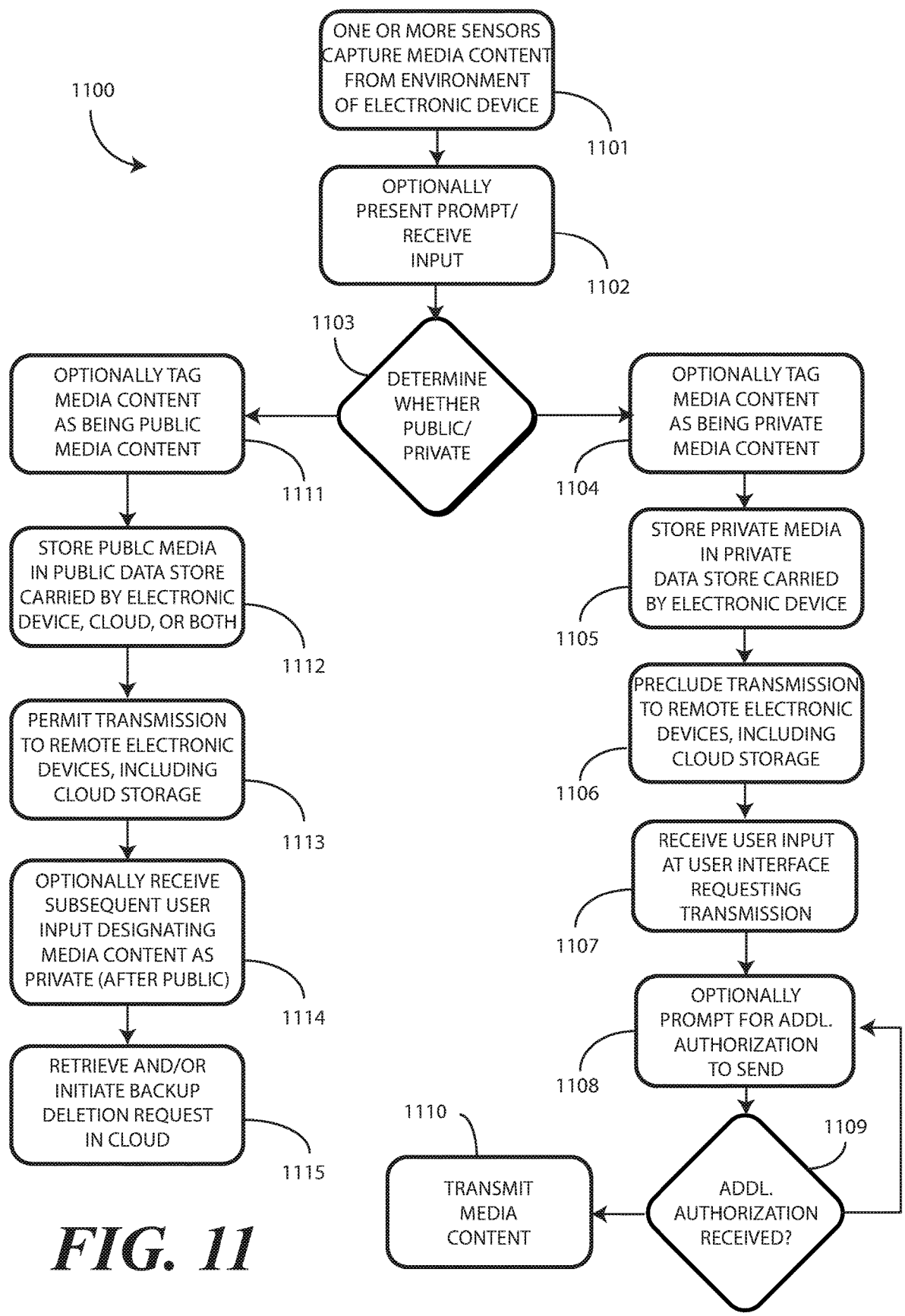
FIG. 11 illustrates still another method in accordance with one or more embodiments of the disclosure.

Turning now to FIG. 11, illustrated therein is yet another method 1100 in accordance with one or more embodiments of the disclosure. At step 1101, one or more sensors of an electronic device capture media content from an environment of the electronic device. At optional step 1102, one or more processors of the electronic device optionally present, at a user interface of the electronic device after the one or more sensors capture the media content at step 1101, and before the one or more processors determine whether the media content is the private media content at decision 1103, a prompt requesting user input designating the media content as the private media content if the media content is the private media content. Where this occurs, step 1102 can also comprise receiving the user input designating the media content as private media content or public media content.

At decision 1103, the one or more processors determine whether the media content is private media content or public media content. Where step 1102 is included, decision 1103 can comprise determining whether the media content is the private media content as a function of the user input. Where step 1102 is omitted, any of the techniques described above with reference to FIG. 10 could be used to make the determination at decision 1103.

Where the media content is private media content, optional step 1104 can comprise tagging the media content as being private media content. Additionally, step 1104 can comprise tagging the media content with information received from other sensors of the electronic device. However, in one or more embodiments, step 1104 comprises precluding the use of information received from remote electronic devices when tagging the private media content.

Step 1105 comprises storing the private media content in a private data store. In one or more embodiments, the private data store is situated only within the electronic device. For example, the private data store could be a secure memory chip located exclusively on a printed circuit board of the electronic device.

Step 1106 comprises precluding transmission of the private media content from the private data store to any other electronic devices. By storing the private media content in the private data store, step 1106 gives the user peace of mind about certain content user deems to be private.

However, should the user change their mind, optional step 1107 comprises receiving, at the user interface of the electronic device, other user input requesting transmission of the private media content to another electronic device. Step 1108 can comprise presenting, in response to the other user input at the user interface, a prompt indicating that the private media content is precluded from transmission to the other electronic device. The prompt presented at step 1108 can optionally request additional authorization to transmit the media content to the other electronic device.

Decision 1109 determines whether the additional authorization to transmit the private media content to the other electronic device is received in response to the prompt. Where it is, step 1110 comprises ceasing the preclusion of transmission of the media content to the other electronic device and instead causing a communication device to transmit the media content to the other electronic device.

Where the media content is public media content, step 1111 can optionally comprise tagging the media content as the public media content. Step 1111 can also include retrieving information from one or more servers across a network for use in tagging the media content as well.

Step 1112 comprises storing the public media content in the public data store. The public data store could be situated exclusively within the electronic device, partially within the electronic device, or somewhere else, such as in a companion electronic device like a jump drive or thumb drive, or in a cloud server, or in combinations thereof. Step 1113 comprises permitting transmission of the public media content from the public data store to other electronic devices without restriction.

Should the user change their mind after the public media content is stored in the public data store at step 1112, step 1114 can comprise a user interface receiving user input designating the media content instead as private media content after the one or more processors store the media content in the public data store. Accordingly, step 1115 can comprise the one or more processors further, in response to the user input received at step 1114, storing the private media content in the private data store, deleting storage of the media content in the public data store, and precluding transmission of the private media content to the another electronic device.

Figure 12:
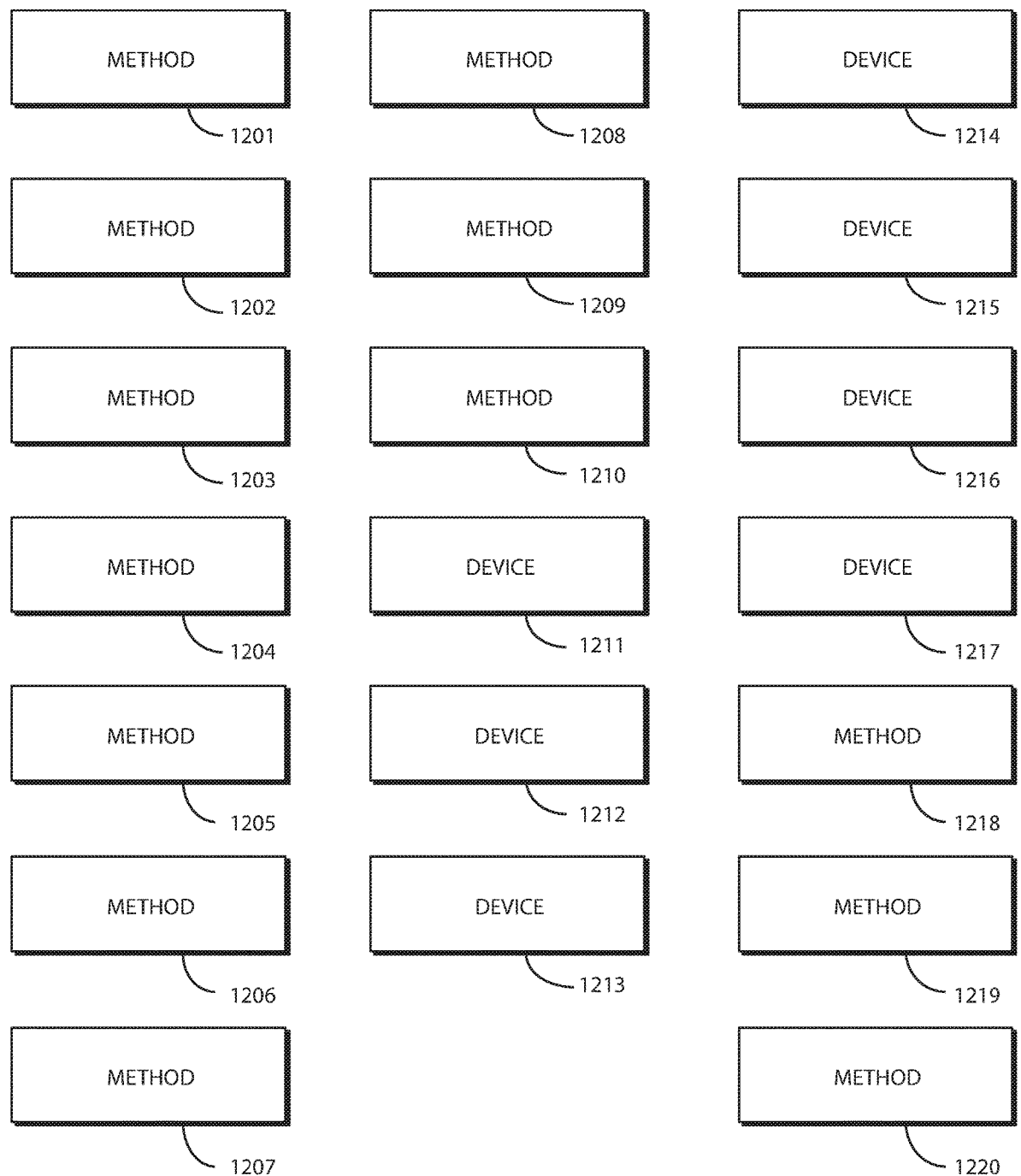
FIG. 12 illustrates various embodiments of the disclosure.

Turning now to FIG. 12, illustrated therein are various embodiments of the disclosure. The embodiments of FIG. 12 are shown as labeled boxes in FIG. 12 due to the fact that the individual components of these embodiments have been illustrated in detail in FIGS. 1-11, which precede FIG. 12. Accordingly, since these items have previously been illustrated and described, their repeated illustration is no longer essential for a proper understanding of these embodiments. Thus, the embodiments are shown as labeled boxes.

At 1201, a method in an electronic device comprises capturing, with one or more sensors, media content from an environment of the electronic device. At 1201, the method comprises determining, with one or more processors of the electronic device, whether the media content is private media content.

At 1201, and when the media content is the private media content, the method comprises storing, by the one or more processors, the private media content in a private data store situated in the electronic device and precluding, by the one or more processors, transmission of the private media content from the private data store to another electronic device.

At 1202, the method of 1201 further comprises, when the media content is other than the private media content, storing, by the one or more processors, the media content in a public data store. At 1212, the method comprises permitting, by the one or more processors, transmission of the media content to the other electronic device.

At 1203, the method of 1202 further comprises receiving, at a user interface of the electronic device prior to the capturing the media content, user input designating the media content as the private media content. At 1204, the method of 1203 further comprises enabling, by the one or more processors, at least one sensor of the electronic device operable to capture the media content, thereby allowing the at least one sensor of the electronic device to capture the media content. At 1204, the method comprises disabling, by the one or more processors, at least one other sensor of the electronic device operable to capture the media content, thereby precluding the at least one other sensor from capturing the media content.

At 1205, the method of claim 1204 further comprises receiving, at a user interface of the electronic device after the storing the media content in the public data store, user input designating the media content as the private media content. At 1205, the method comprises storing, by the one or more processors, the private media content in the private data store situated in the electronic device. At 1205, the method comprises causing, by the one or more processors, deletion of the media content from the public data store.

At 1206, the method of 1202 further comprises receiving, at a user interface, other user input requesting transmission of the private media content to the other electronic device. At 1206, the method comprises presenting, in response to the other user input at the user interface, a prompt indicating that the private media content is precluded from transmission to the other electronic device.

At 1207, the prompt of 1206 requests additional authorization to transmit the media content to the other electronic device. At 1207, the method of 1206 further comprises receiving, at the user interface, the additional authorization to transmit the private media content to the other electronic device in response to the prompt. At 1207, the method comprises ceasing, by the one or more processors in response to the receiving the additional authorization to transmit the private media content to the another electronic device, the precluding the transmission of the media content to the other electronic device. At 1207, the method comprises causing, by the one or more processors in response to the ceasing, a communication device to transmit the media content to the other electronic device. Referring to last the additional authorization received at step 1207, embodiments of the disclosure contemplate that this additional authorization may allow transmission of the media content at step 1207, but with certain portions of the media content redacted, obscured, or blurred. For example, an authorized user might override privacy to share media content with public storage while blurring certain content contained in the media content, e.g., someone's face, financial information, addresses, and so forth. in one or more embodiments, such obfuscation of portions of the media content only occurs when previously marked private media content is overridden and converted to public media content so as to be shared.

At 1208, the method of 1202 comprises presenting, by the one or more processors at a user interface of the electronic device after the one or more sensors capture the media content and before the one or more processors determine whether the media content is the private media content, a prompt requesting user input designating the media content as the private media content if the media content is the private media content. At 1208, the method comprises receiving the user input designating the media content as the private media content. At 1208, the determining whether the media content is the private media content occurs as a function of the user input.

At 1209, the method of 1202 further comprises determining, by a location detector operable with the one or more processors, a location of the electronic device when the one or more sensors capture the media content. At 1209, the determining whether the media content is the private media content occurs as a function of the location of the electronic device when the one or more sensors capture the media content.

At 1210, the method of 1202 further comprises receiving, by the one or more sensors, contextual data input from the environment of the electronic device. At 1210, the determining whether the media content is the private media content occurs as a function of the contextual data input.

At 1211, an electronic device comprises one or more sensors capturing media content from an environment of the electronic device. At 1211, the electronic device comprises one or more processors, operable with the one or more sensors, determining whether the media content is private media content.

At 1211, the electronic device comprises a private data store, situated in the electronic device and operable with the one or more processors, and a public data store operable with the one or more processors. At 1211, when the one or more processors determine the media content is the private media content, the one or more processors store the private media content in the private data store and preclude transmission of the private media content from the private data store to another electronic device. Alternatively, when the one or more processors determine the media content is other than the private media content, the one or more processors store the media content in the public data store and permit transmission of the media content to the other electronic device at 1211. At 1212, the public data store is situated at a cloud server in electronic communication with the electronic device across a network.

At 1213, the electronic device of 1212 further comprises a user interface receiving user input designating the media content as the private media content after the one or more processors store the media content in the public data store. At 1213, the one or more processors further, in response to the user input, store private media content in the private data store, delete storage of the media content in the public data store, and preclude transmission of the private media content to the other electronic device.

At 1214, the electronic device of 1211 further comprises a user interface receiving user input designating the media content as the private media content prior to the one or more sensors capturing the media content. At 1215, the one or more sensors of 1214 comprise at least a first sensor operable to capture the media content when the user input designates the media content as the private media content and at least a second sensor operable to capture the media content when the user input fails to designate the media content as the private media content. At 1215, the one or more processors enable the at least a first sensor and disable the at least a second sensor in response to the user input.

At 1216, the electronic device of 1211 further comprises a context engine receiving contextual data from the environment of the electronic device while the one or more sensors capture the media content. At 1216, the one or more processors determine whether the media content is the private media content from the contextual data.

At 1217, the electronic device of 1211 further comprises a user interface. At 1217, the one or more processors present at the user interface of the electronic device after the one or more sensors capture the media content and before the one or more processors determine whether the media content is the private media content, a prompt requesting user input designating the media content as the private media content. At 1217, the one or more processors designate the media content as the other than the private media content upon failing to receive the user input designating the media content as the private media content.

At 1218, a method in an electronic device comprises determining, by one or more processors of the electronic device, whether media content captured by one or more sensors of the electronic device is private media content or public media content. At 1218, when the media content is the private media content, the method comprises storing the private media content in a private data store carried by the electronic device and precluding transmission of the private media content from the private data store to another electronic device. Alternatively, when the media content is the public media content, the method comprises storing the public media content in a public data store and permitting transmission of the media content from the public data store to the other electronic device.

At 1219, the determining whether the media content captured by the one or more sensors is the private media content or the public media content at 1218 comprises designating the media content as the public media content in an absence of user input designating the media content as the private media content.

At 1220, the method of 1218 further comprises receiving, at a user interface of the electronic device prior to the one or more sensors capture the media content, user input designating the media content as the private media content. At 1220, the method comprises causing, by the one or more processors, at least a first microphone or a first imager to capture the media content in response to the user input and precluding, by the one or more processors, at least a second microphone or a second imager from capturing the media content in response to the user input.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:
    capturing, with one or more sensors, media content from an environment of the electronic device;
    determining, with one or more processors of the electronic device, whether the media content is private media content; and
    when the media content is the private media content:
        storing, by the one or more processors, the private media content in a private data store situated in the electronic device; and
        precluding, by the one or more processors, transmission of the private media content from the private data store to another electronic device;
    further comprising, when the media content is other than the private media content:
        storing, by the one or more processors, the media content in a public data store; and
        permitting, by the one or more processors, transmission of the media content to the another electronic device;
    further comprising receiving, at a user interface of the electronic device prior to the capturing the media content, user input designating the media content as the private media content;
    further comprising:
        enabling, by the one or more processors, at least one sensor of the electronic device operable to capture the media content, thereby allowing the at least one sensor of the electronic device to capture the media content; and
        disabling, by the one or more processors, at least one other sensor of the electronic device operable to capture the media content, thereby precluding the at least one other sensor from capturing the media content.

2. The method of claim 1, wherein the private data store and the public data store are separated.

3. The method of claim 2, wherein the at least one sensor of the electronic device comprises a media content capture sensor that is hard wired to the private data store.

4. The method of claim 3, wherein the at least one other sensor of the electronic device comprises another media content capture sensor that is hard wired to the public data store.

5. The method of claim 1, further comprising:
    receiving, at a user interface of the electronic device after the storing the media content in the public data store, user input designating the media content as the private media content;
    storing, by the one or more processors, the private media content in the private data store situated in the electronic device; and
    causing, by the one or more processors, deletion of the media content from the public data store.

6. The method of claim 2, further comprising receiving, at a user interface, other user input requesting transmission of the private media content to the another electronic device and presenting, in response to the other user input at the user interface, a prompt indicating that the private media content is precluded from transmission to the another electronic device.

7. The method of claim 6, the prompt requesting additional authorization to transmit the media content to the another electronic device, the method further comprising:
    receiving, at the user interface, the additional authorization to transmit the private media content to the another electronic device in response to the prompt;
    ceasing, by the one or more processors in response to the receiving the additional authorization to transmit the private media content to the another electronic device, the precluding the transmission of the media content to the another electronic device; and
    causing, by the one or more processors in response to the ceasing, a communication device to transmit the media content to the another electronic device.

8. The method of claim 2, further comprising:
    presenting, by the one or more processors at a user interface of the electronic device after the one or more sensors capture the media content and before the one or more processors determine whether the media content is the private media content, a prompt requesting user input designating the media content as the private media content if the media content is the private media content; and receiving the user input designating the media content as the private media content;

wherein the determining whether the media content is the private media content occurs as a function of the user input.

9. The method of claim 2, further comprising:

determining, by a location detector operable with the one or more processors, a location of the electronic device when the one or more sensors capture the media content;

wherein the determining whether the media content is the private media content occurs as a function of the location of the electronic device when the one or more sensors capture the media content.

10. The method of claim 2, further comprising:

receiving, by the one or more sensors, contextual data input from the environment of the electronic device;

wherein the determining whether the media content is the private media content occurs as a function of the contextual data input.

11. An electronic device, comprising:

one or more sensors capturing media content from an environment of the electronic device;

one or more processors, operable with the one or more sensors and determining whether the media content is private media content;

a private data store, situated in the electronic device and operable with the one or more processors;

a user interface receiving user input designating the media content as the private media content prior to the one or more sensors capturing the media content; and a public data store operable with the one or more processors;

wherein:
when the one or more processors determine the media content is the private media content, the one or more processors:
store the private media content in the private data store; and
preclude transmission of the private media content from the private data store to another electronic device; or
when the one or more processors determine the media content is other than the private media content, the one or more processors:
store the media content in the public data store; and
permit transmission of the media content to the another electronic device; and
the one or more sensors comprise at least a first sensor operable to capture the media content when the user input designates the media content as the private media content and at least a second sensor operable to capture the media content when the user input fails to designate the media content as the private media content, the one or more processors enabling the at least a first sensor and disabling the at least a second sensor in response to the user input.

12. The electronic device of claim 11, wherein the public data store is situated at a cloud server in electronic communication with the electronic device across a network.

13. The electronic device of claim 12, further comprising a user interface receiving user input designating the media content as the private media content after the one or more processors store the media content in the public data store, the one or more processors further, in response to the user input:
storing private media content in the private data store;
deleting storage of the media content in the public data store; and
precluding transmission of the private media content to the another electronic device.

14. The electronic device of claim 11, the one or more sensors comprising at least one audio sensor.

15. The electronic device of claim 14, wherein the one or more sensors comprise at least one image capture device.

16. The electronic device of claim 11, further comprising a context engine receiving contextual data from the environment of the electronic device while the one or more sensors capture the media content, wherein the one or more processors determine whether the media content is the private media content from the contextual data.

17. The electronic device of claim 11, further comprising a user interface, the one or more processors further:
presenting at the user interface of the electronic device after the one or more sensors capture the media content and before the one or more processors determine whether the media content is the private media content, a prompt requesting user input designating the media content as the private media content; and
designating the media content as the other than the private media content upon failing to receive the user input designating the media content as the private media content.

18. The electronic device of claim 11, wherein the public data store is situated in a companion electronic device.

19. The electronic device of claim 11, the one or more processors further presenting a visual indicator on the user interface indicating whether the at least a first sensor or the at least a second sensor is enabled.

20. The electronic device of claim 11, the one or more processors further presenting a visual indicator on the user interface indicating a determined privacy level associated with the media content.

* * * * *